United States Patent
Qiu et al.

(10) Patent No.: US 8,806,630 B2
(45) Date of Patent: Aug. 12, 2014

(54) METHODS AND APPARATUS FOR INTRUSION PROTECTION IN SYSTEMS THAT MONITOR FOR IMPROPER NETWORK USAGE

(75) Inventors: Chaoxin Qiu, Austin, TX (US); Niral Sheth, Austin, TX (US)

(73) Assignee: AT&T Intellectual Property, I, L.P., Atlanta, GA (US)

( * ) Notice: Subject to any disclaimer, the term of this patent is extended or adjusted under 35 U.S.C. 154(b) by 1151 days.

(21) Appl. No.: 12/119,936

(22) Filed: May 13, 2008

(65) Prior Publication Data

US 2009/0288165 A1    Nov. 19, 2009

(51) Int. Cl.
*H04L 29/06* (2006.01)

(52) U.S. Cl.
CPC ............ *H04L 63/08* (2013.01); *H04L 63/1416* (2013.01); *H04L 63/10* (2013.01); *H04L 63/14* (2013.01); *H04L 63/30* (2013.01); *H04L 63/308* (2013.01)
USPC .................. 726/23; 726/22; 726/26; 380/267

(58) Field of Classification Search
CPC ..... H04L 63/1416; H04L 63/08; H04L 63/10; H04L 63/14; H04L 63/30; H04L 63/308
USPC .................. 726/22, 23, 26; 380/267; 370/428
See application file for complete search history.

(56) References Cited

U.S. PATENT DOCUMENTS

| | | | | |
|---|---|---|---|---|
| 7,246,376 | B2 * | 7/2007 | Moharram | 726/23 |
| 7,472,418 | B1 * | 12/2008 | McCorkendale et al. | 726/24 |
| 7,568,224 | B1 * | 7/2009 | Jennings et al. | 726/14 |
| 7,802,065 | B1 * | 9/2010 | Eatough | 711/158 |
| 8,516,573 | B1 * | 8/2013 | Brown et al. | 726/22 |
| 2001/0014093 | A1 * | 8/2001 | Yoda et al. | 370/389 |
| 2005/0108568 | A1 * | 5/2005 | Bussiere et al. | 713/201 |
| 2005/0259667 | A1 | 11/2005 | Vinokurov et al. | |
| 2006/0230457 | A1 * | 10/2006 | Hagan et al. | 726/26 |
| 2007/0011743 | A1 * | 1/2007 | Krishnamurthy | 726/23 |
| 2007/0041362 | A1 | 2/2007 | Lam et al. | |
| 2007/0041402 | A1 | 2/2007 | Sekaran et al. | |
| 2007/0091907 | A1 | 4/2007 | Seshadri et al. | |

(Continued)

FOREIGN PATENT DOCUMENTS

EP          2018013        *    1/2009

OTHER PUBLICATIONS

Chen, "Extracting Ambiguous Sessions from Real Traffic with Intrusion Prevention Systems", Sep. 2012, International Journal of Network Security, vol. 14, p. 243-250.*

*Primary Examiner* — Taghi Arani
*Assistant Examiner* — Gregory Lane
(74) *Attorney, Agent, or Firm* — Hanley, Flight & Zimmerman, LLC

(57) ABSTRACT

Methods and apparatus for intrusion protection in systems that monitor for improper network usage are disclosed. An example method to protect a service platform comprises detecting responses from the service platform indicative of questionable signaling protocol transactions. The example method further comprises storing transaction records corresponding to questionable signaling protocol transaction records with at least one of the transaction records identifying a signaling protocol message including an associated originating device address corresponding to a respective questionable transaction record. Additionally, the method comprises determining whether the originating device address is associated with an improper intrusion of the service platform based on at least one on the transaction records corresponding to the originating device address.

38 Claims, 9 Drawing Sheets

(56) References Cited

U.S. PATENT DOCUMENTS

2007/0104212 A1* 5/2007 Gutman ................. 370/428
2007/0133803 A1* 6/2007 Saito et al. ............. 380/267
2007/0177615 A1 8/2007 Miliefsky
2008/0134328 A1* 6/2008 Yang et al. ............. 726/22
2008/0262991 A1* 10/2008 Kapoor et al. .......... 706/20

* cited by examiner

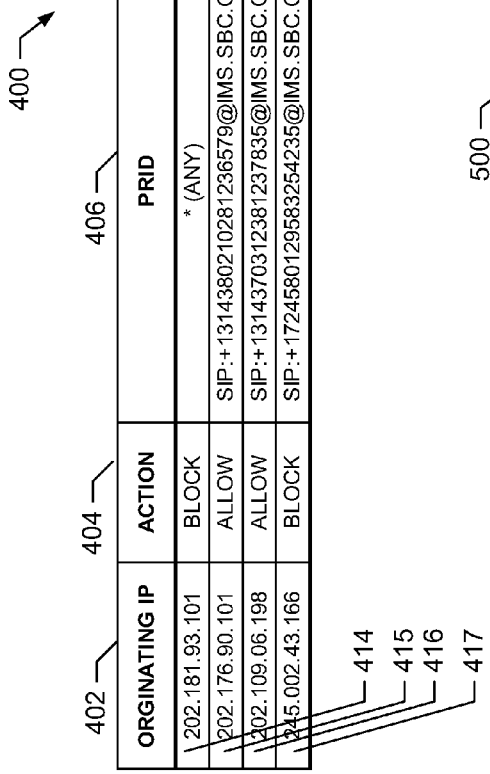

FIG. 4

| ORIGINATING IP 402 | ACTION 404 | PRID 406 | PUID 408 | RECORD TIME 410 | TIME-TO-KEEP (HOURS) 412 |
|---|---|---|---|---|---|
| 202.181.93.101 | BLOCK | *(ANY) | *(ANY) | TIME STAMP | 48 |
| 202.176.90.101 | ALLOW | SIP:+13143802102812365579@IMS.SBC.COM | SIP:+13143802102@IMS.SBC.COM | TIME STAMP | 156 |
| 202.109.06.198 | ALLOW | SIP:+13143703123812378355@IMS.SBC.COM | SIP:+13143703123@IMS.SBC.COM | TIME STAMP | 48 |
| 245.002.43.166 | BLOCK | SIP:+17245801295832542355@IMS.SBC.COM | SIP:+17245801295@IMS.SBC.COM | TIME STAMP | 24 |

414
415
416
417

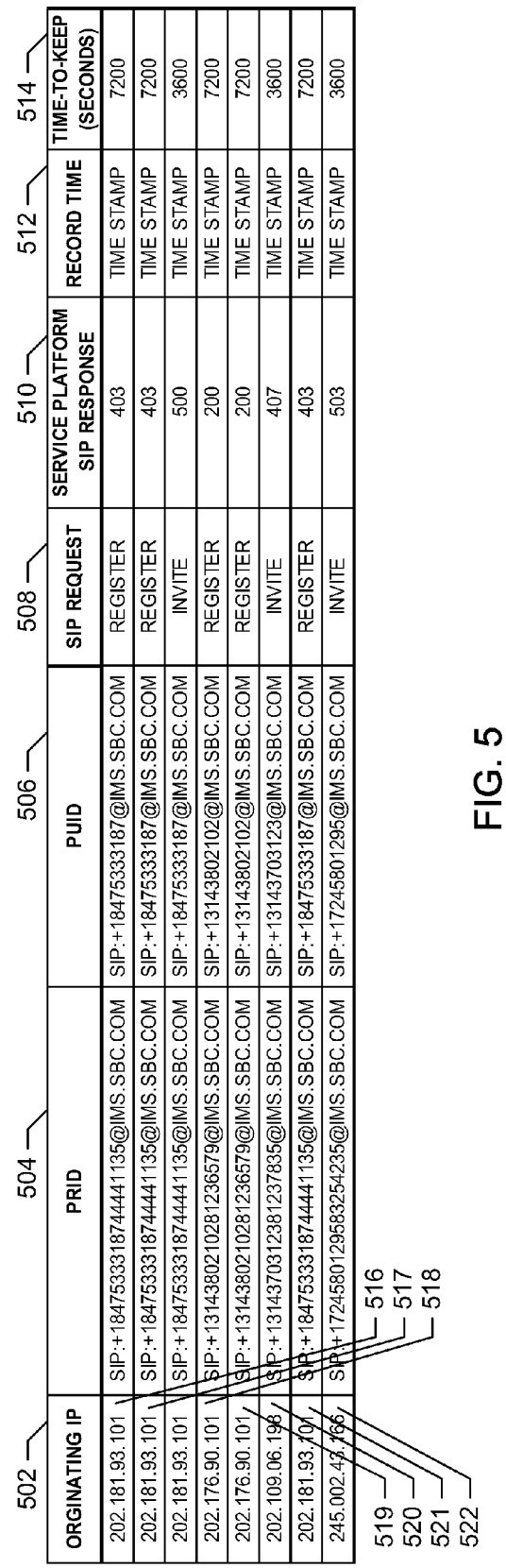

FIG. 5

| ORIGINATING IP 502 | PRID 504 | PUID 506 | SIP REQUEST 508 | SERVICE PLATFORM SIP RESPONSE 510 | RECORD TIME 512 | TIME-TO-KEEP (SECONDS) 514 |
|---|---|---|---|---|---|---|
| 202.181.93.101 | SIP:+18475333187444411355@IMS.SBC.COM | SIP:+18475333187@IMS.SBC.COM | REGISTER | 403 | TIME STAMP | 7200 |
| 202.181.93.101 | SIP:+18475333187444411355@IMS.SBC.COM | SIP:+18475333187@IMS.SBC.COM | REGISTER | 403 | TIME STAMP | 7200 |
| 202.181.93.101 | SIP:+18475333187444411355@IMS.SBC.COM | SIP:+18475333187@IMS.SBC.COM | INVITE | 500 | TIME STAMP | 3600 |
| 202.176.90.101 | SIP:+13143802102812365579@IMS.SBC.COM | SIP:+13143802102@IMS.SBC.COM | REGISTER | 200 | TIME STAMP | 7200 |
| 202.176.90.101 | SIP:+13143802102812365579@IMS.SBC.COM | SIP:+13143802102@IMS.SBC.COM | REGISTER | 200 | TIME STAMP | 7200 |
| 202.109.06.198 | SIP:+13143703123812378355@IMS.SBC.COM | SIP:+13143703123@IMS.SBC.COM | INVITE | 407 | TIME STAMP | 3600 |
| 202.181.93.101 | SIP:+18475333187444411355@IMS.SBC.COM | SIP:+18475333187@IMS.SBC.COM | REGISTER | 403 | TIME STAMP | 7200 |
| 245.002.43.166 | SIP:+17245801295832542355@IMS.SBC.COM | SIP:+17245801295@IMS.SBC.COM | INVITE | 503 | TIME STAMP | 3600 |

516
517
518
519
520
521
522

| SIP REQUEST | SIP RESPONSE FROM PLATFORM | SAME PUID & PRID WITH DIFFERENT IP | TRANSACTION THRESHOLD | OBSERVATION WINDOW (SECONDS) | ACTION | ACTION APPLIED TIME (HOURS) |
|---|---|---|---|---|---|---|
| ANY | ANY | YES | 60 | 60 | BLOCK | 48 |
| ANY | 400 | NO | 15 | 30 | BLOCK | 24 |
| ANY | 405 | NO | 15 | 30 | BLOCK | 24 |
| ANY | 406 | NO | 15 | 30 | BLOCK | 24 |
| ANY | 413 | NO | 15 | 30 | BLOCK | 24 |
| ANY | 414 | NO | 15 | 30 | BLOCK | 24 |
| ANY | 416 | NO | 15 | 30 | BLOCK | 24 |
| ANY | 420 | NO | 15 | 30 | BLOCK | 24 |
| ANY | 421 | NO | 15 | 30 | BLOCK | 24 |
| ANY | 423 | NO | 15 | 30 | BLOCK | 24 |
| ANY | 485 | NO | 15 | 30 | BLOCK | 24 |
| ANY | 493 | NO | 15 | 30 | BLOCK | 24 |
| ANY | 505 | NO | 15 | 30 | BLOCK | 24 |
| REGISTER | 401 | YES | 10 | 20 | BLOCK | 48 |
| REGISTER | 403 | YES | 10 | 20 | BLOCK | 48 |
| REGISTER | 401 | NO | 60 | 1800 | ALERT | N/A |
| REGISTER | 403 | NO | 30 | 1800 | ALERT | N/A |
| REGISTER | 413 | NO | 15 | 30 | BLOCK | 24 |
| REGISTER | 414 | NO | 15 | 30 | BLOCK | 24 |
| REGISTER | 416 | NO | 15 | 30 | BLOCK | 24 |
| REGISTER | 420 | NO | 15 | 30 | BLOCK | 24 |
| REGISTER | 423 | NO | 15 | 30 | BLOCK | 24 |
| INVITE | 407 | YES | 10 | 20 | BLOCK | 48 |
| INVITE | 407 | NO | 60 | 1800 | ALERT | N/A |
| INVITE | 415 | NO | 15 | 30 | BLOCK | 24 |
| INVITE | 482 | NO | 15 | 30 | BLOCK | 24 |
| INVITE | 483 | NO | 15 | 30 | BLOCK | 24 |
| INVITE | 484 | NO | 15 | 30 | BLOCK | 24 |

FIG. 6

METHODS AND APPARATUS FOR INTRUSION PROTECTION IN SYSTEMS THAT MONITOR FOR IMPROPER NETWORK USAGE

FIELD OF THE DISCLOSURE

This disclosure relates generally to communication network monitoring and, more particularly, to methods and apparatus for intrusion protection in systems that monitor for improper network usage.

BACKGROUND

Systems to mitigate improper network usage are deployed in service provider networks, business data centers, etc., to detect abnormal, suspicious, questionable, disapproved, and/or fraudulent network usage associated with, for example, a customer's account, equipment, devices, etc. Early detection allows swift responsive action to mitigate the potential harm to the customer and/or the network caused by the improper, suspicious, questionable, disapproved, and/or fraudulent network usage. For example, if the detected questionable network usage is caused by account theft, device theft, network hijacking, etc., then early detection and quick responsive action can limit the damage, resource disruption, and/or financial loss to the customer and/or the service provider.

In Voice over Internet Protocol (VoIP) networks based on an IP Multimedia Subsystem (IMS), protecting the service infrastructure against application level attacks currently comprises Intrusion Detection Systems (IDSs), Intrusion Protection Systems (IPSs), Deep Packet Inspections (DPIs), and/or firewalls. IDSs monitor network traffic and/or protocols for inappropriate traffic, illegal activity, and/or constructs of malicious language (e.g., SQL) and can take automatic actions to block such activities. IPSs monitor network traffic and/or protocols for inappropriate traffic, illegal activity, and/or constructs of malicious language (e.g., SQL) and send traps to network operation control upon detection of such activities. DPIs examine data and/or header information within a packet as it passes an inspection point. DPIs may search for non-protocol compliance messages, viruses, span, and/or predefined criteria specified by a network operator. IPSs and IDSs typically include some DPI functionality. Firewalls are configured to prevent network access by unauthorized network users.

BRIEF DESCRIPTION OF THE DRAWINGS

FIG. 4 shows an example Watch List that may be utilized by the example system of FIG. 1.

FIG. 5 shows an example Transaction Cache that may be utilized by the example system of FIG. 1.

FIG. 6 shows an example set of Detection Rules that may be utilized by the example system of FIG. 1.

DETAILED DESCRIPTION

Figure 1:
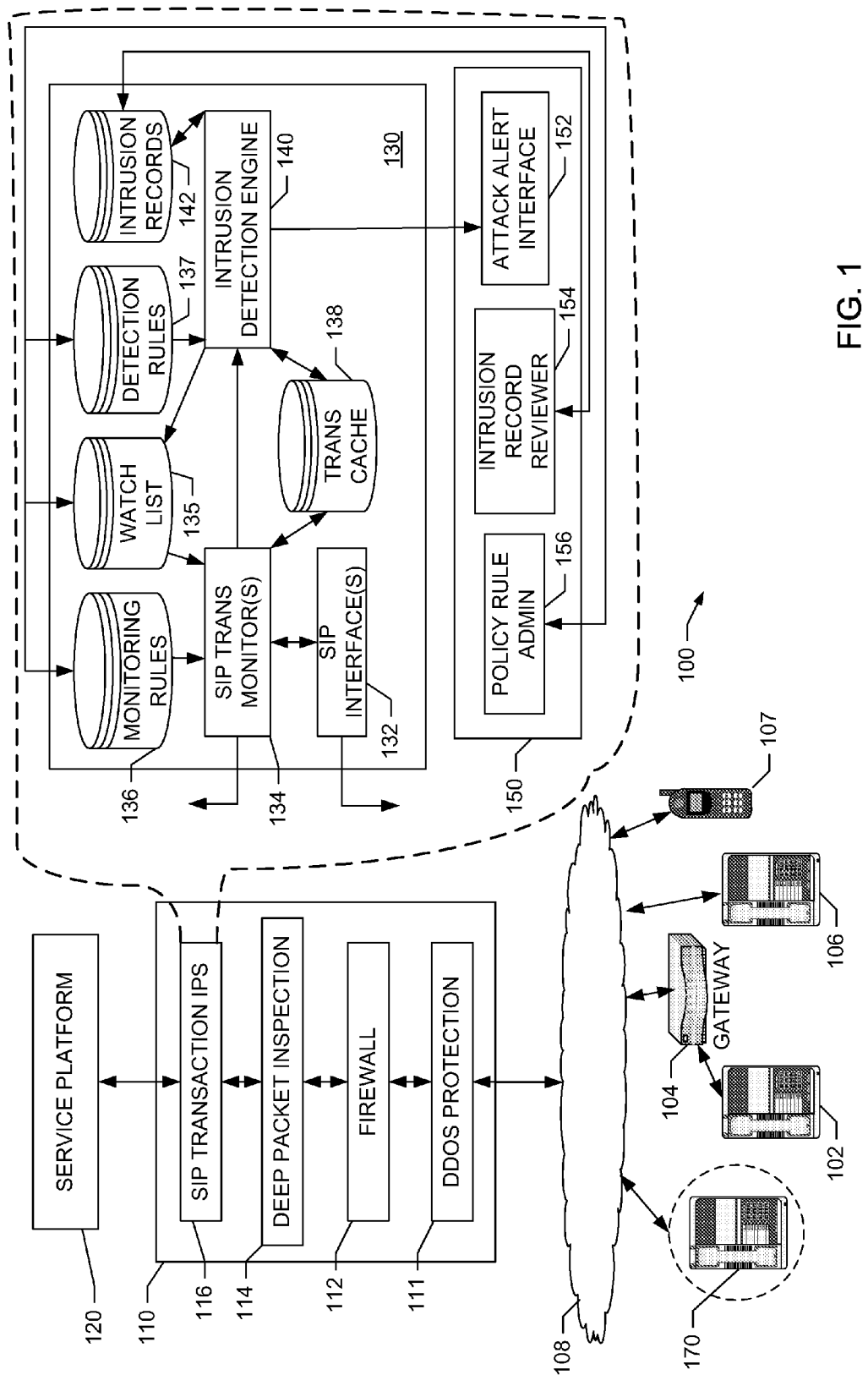
FIG. 1 is a block diagram of an example communication network that includes an example system to mitigate improper network usage.

Example methods and apparatus for security checking to mitigate improper network usage are disclosed herein. The example security checking methods and apparatus illustrated herein can be used in systems to mitigate improper network usage occurring in, for example, voice-over-internet-protocol (VoIP) networks, broadband networks, wireless networks, SIP-based communication networks, and/or any other next generation signaling protocol based multimedia communication networks. The example security checking methods and apparatus illustrated herein can be configured to function in conjunction with, for example, one or more transaction monitors, one or more intrusion detection engines, one or more sets of policy rules, and/or one or more other operations systems to assist a service provider to reduce the probability of successful hostile attacks based on normal SIP request messages. Such a reduction in the probability of successful hostile attacks may reduce network costs arising from stolen subscriber account information and/or improper utilization of network resources and/or bandwidth.

In VoIP and/or SIP-based networks based on an IP Multimedia Subsystem (IMS), protecting the service infrastructure against application level attacks currently comprises Intrusion Detection Systems (IDSs), Intrusion Protection Systems (IPSs), Deep Packet Inspections (DPIs), and/or firewalls. Legitimate VoIP customers have a publically known Public User Identifier (PUID) that is typically a Session Initiation Protocol (SIP) Uniform Resource Identifier (URI) based on an assigned telephone number. An attacker could construct normal SIP REGISTER messages with a known PUID and send the messages to a service platform at a relatively slow, continuous pace. Typical Denial of Service (DOS) protection algorithms cannot detect these messages because their transmission reception would be non-intensive. Additionally, typical IDSs, IPSs, DPIs, and firewalls may not be capable of detecting these messages because the incoming messages look no different from legitimate SIP REGISTER messages transmitted from a known and authorized PUID. If such improper or questionable messages cannot be detected and blocked, service platform performance will degrade because the questionable SIP level messages migrate deep into the platform, causing degradation of the processing resources in session control layer and in the subscriber database. Attackers may also use such improper or questionable messages to discover information concerning a subscriber account, such as the Private User Identifier (PRID) or private customer information. Attackers can use this information to cause service disruption and/or financial loss to customers and/or service providers. The improper usage mitigation system including the transaction monitor and intrusion detection engine described herein prevent such improper or questionable messages from penetrating the service platform including account information and/or degrading the service platform performance.

In an example implementation of a security checking system as described herein, a transaction monitor checks requests from customer premise equipment (CPE) communication devices against a Watch List. The transaction monitor also links service provider service platform responses with the corresponding CPE device requests and saves the information as a transaction record. The transaction monitor receives CPE device requests following the CPE device request passing through other layers of security that may include Distributed Denial of Service (DDOS) filters, firewalls, Deep Packet Inspection, etc.

In an example operation, the transaction monitor may receive a request from a CPE device and check the end point IP address against a watch list of IP addresses to be blocked or specifically allowed. The device request is blocked if the originating IP address is specified to be "Blocked" in the watch list. The device request is forwarded to the service platform if the originating IP address is specified to be "Allowed" in the watch list. Otherwise the request from the device is saved and the request is forwarded to the service platform. The transaction monitor then links a service platform response to the CPE device request creating a transaction record. This transaction record is compared to a set of monitoring rules. If the transaction record matches at least one monitoring rule, the transaction record is saved within a transaction cache and the transaction monitor sends a notification to an intrusion detection engine. At this point, the transaction record is considered questionable or suspicious. This questionable transaction record is stored in the transaction cache until a time-to-keep parameter expires.

In an example implementation, the set of monitoring rules may be derived from a historical analysis of network activity within the VoIP communication network of a service provider. Additionally or alternatively, the monitoring rules may be modified by an operator, and/or network administrator of the security system. An example set of monitoring rules may define a set of policy conditions that may include specific device request types and corresponding service platform responses.

In an example implementation of a security checking system as described herein, the intrusion detection engine tracks questionable transaction records and identifies hostile devices based on, for example, a transaction history and/or a set of detection rules. In an example operation, when the intrusion detection engine receives notification from the transaction monitor, the intrusion detection engine references the IP address, the PRID, and/or the PUID of the questionable transaction record and locates all transaction records in the transaction record cache with the same IP address, the same PRID, and/or the same PUID. The intrusion detection engine then deletes transaction records older then a time-to-keep parameter, and employs one or more counters to count the number of transaction records matching each detection rule. The number of transaction records in each counter is compared to a threshold value specified within each detection rule. If the comparison is negative, the intrusion detection engine resets the counters and waits for another notification from the transaction monitor. If the comparison is positive and returns a block action, the intrusion detection engine inserts the originating device IP address, the PUID, and/or the PRID into the Watch list, inserts all transaction records from the IP address into an intrusion record repository, and sends an alert to a network operator. If the comparison is positive and returns an alert action, the transaction records from the originating device address may be saved in an intrusion records cache. The intrusion detection engine may also send an alert to the network operator.

In an example implementation, the set of detection rules may be derived from a historical analysis of network activity within the VoIP communication network of a service provider. Additionally or alternatively, the detection rules may be modified by an operator of the enhanced security system. An example set of detection rules may define a set of policy conditions that includes fields for specific device request types and the corresponding service platform response, a PUID-PRID correlation field, a transaction record threshold field, an observation window field, an action field, an action applied time field, etc. The device request type field, the service platform response field, and the PUID-PRID correlation field provide detection criteria used to match questionable transaction records to the detection rules. The values within the transaction record threshold field and observation window field provide frequency criteria to specify the numerical threshold of questionable transaction records matching each detection rule within a time period. The action field and the action applied time field include actions and the action duration to be executed when the detection criteria and frequency criteria within the detection rules are met. An example action includes blocking the originating device IP address and/or sending an alert to the network operator. The network operator includes a network administrator, a network alert interface, and/or a network health monitor.

Some example implementations of the automatic security checking methods and apparatus disclosed herein utilize features provided by the Session Initiation Protocol (SIP). SIP features may be used, for example, to implement an example transaction monitor, an example intrusion detection engine and/or other aspects of the example automatic security checking methods and apparatus illustrated herein.

Example automatic security checking methods and apparatus for improper usage mitigation systems are illustrated in FIG. 1 in the context of an example communication system 100. The example communication system 100 of FIG. 1 can be implemented by a service provider using any type of access communication system, such as, for example, a fiber optic communication system implementing Fiber to the Home or Fiber to the Curb (e.g., such as AT&T's Project Lightspeed™), a digital subscriber line (DSL) communication system (e.g., such as a DSL system implemented using asymmetric DSL (ADSL), very high data rate DSL (VDSL), etc.), a cable television communication system, a satellite communication system, a microwave communication system, a mobile telephone communication system, a public switched telephone (PSTN) communication system, a 2 G, a 2.5 G, and/or a 3 G wireless communication network access, etc. The communication system 100 of the illustrated example is further configured to support call processing associated with VoIP telephony and/or SIP-based multimedia communication. However, the example automatic security checking methods and apparatus illustrated herein may be readily adapted to support call processing associated with other types of communication protocols and/or systems.

The example communication system 100 of FIG. 1 supports various types of customer premises equipment (CPE) devices served by one or more service providers. Supported CPE devices include a variety of VoIP and/or SIP based user endpoint devices (UEs), such as, for example, an analog telephone 102 connected via an Analog Telephony Adapter (ATA) device 104, an internet protocol (IP) telephone 106, a soft telephone executing on a personal computer (not shown), etc. Other supported CPE devices include a mobile telephone 107 implemented by, for example, a dual-mode wireless/WiFi handheld device, a 2 G, 2.5 G and/or 3G wireless handheld device, and/or any other type of wireless device. Still other example supported CPE devices include a multimedia display implemented by, for example, any type of television, monitor, computer, etc., as well as any other type of CPE devices not shown. The ATA device 104 may also implement, or be implemented by, other residential access devices, such as, for example, IEEE 802.11x access points, WiFi access points, WiMax access points, xDSL modems, AT&T Lightspeed™ Residential Gateways, etc.

The example communication system 100 shown in FIG. 1 includes one or more service access networks 108. The service access networks 108 may be implemented by, for example, IP data access networks, such as, xDSL access networks, Internet data access via cable multiple system operators (MSOs), etc. For example, AT&T's Lightspeed™ access network is an IP data access network that uses Fiber-to-the-x (FTTx) (e.g., Fiber to the Home) technology to provide broadband access for its customers. Other service access networks 108 may be implemented by, for example, 2 G, 2.5 G and/or 3G wireless networks, proprietary access networks, etc. Furthermore, some or all of the service access networks 108 may be implemented by a single physical layer technology, although logically separated according to traffic type. For example, many cable networks use a common physical cable link to provide service access for multiple different traffic types. In particular, some cable systems utilize low frequency bands for Internet data access and utilize high frequency bands for video services. In another example implementation, AT&T's Lightspeed™ network provides integrated time division multiplexed (TDM) voice, VoIP voice, Internet data and/or video services via a single broadband network infrastructure based on gigabit passive optical network (GPON)/broadband passive optical network (BPON) technology.

The example communication system 100 includes network security protection 110 acting as a buffer between the public service access networks 108 and a service provider service platform 120. In the illustrated example, the communication system 100 includes network security, in the form of a DDOS/DOS filter 111, a firewall 112, an IPS and/or IDS that implements certain deep packet inspection algorithms 114, and A SIP transaction IPS 116. Other example implementations may include VPN routers for server site interconnections (not shown). In the illustrated example, still other example implementations of the communication system 100 may utilize only the SIP transaction IPS 116, or the SIP transaction IPS 116 in combination with only some of the DDOS/DDS filter 111, the firewall 112, and/or the deep packet inspection algorithms 114. The SIP transaction IPS 116 monitors communication at the application layer as a final security check. The example SIP transaction IPS 116 includes an improper user mitigation system 130, and an operation support system (OSS) interface 150, as discussed in greater detail below.

The example communication system 100 shown in FIG. 1 includes the service platform 120 that provides support for VoIP and/or SIP-based communication services. The service platform 120 includes one or more VoIP servers and/or SIP-based communication servers. In an example SIP-based communication system, the communication server(s) include one or more Call Session Control Functions (CSCFs) and application feature servers defined by 3GPP IMS standards. The one or more CSCFs implement various call processing functional modules. Other IMS-based call processing servers may implement databases to store customer account and/or service provisioning information, such as the Home Subscriber Server (HSS) defined by the third generation partnership project (3GPP) IP multimedia system (IMS) standard. The one or more IMS-based call processing servers may also implement call session control functions that are responsible for call session set up between calling and called parties. Example call session control functions include the Proxy Call Session Control Function (P-CSCF), the Interrogating Call Session Control Function (I-CSCF) and the Serving Call Session Control Function (S-CSCF) as defined by the 3GPP IMS standard. Additionally, the one or more IMS-based call processing servers may implement IMS-based call feature processing servers, such as the SIP feature servers defined by 3GPP IMS standard.

The service platform 120 may also include functionality (not shown) to implement media gateways, signaling gateways and/or gateway controllers. The media gateways, signaling gateways and/or gateway controllers provide connectivity and interworking between VoIP and other circuit switch-based telephony networks (e.g., such as PSTN and/or pre-3 G wireless networks). The service platform 120 may also include media servers to provide ring tones, announcements and/or media mixing for multi-way calling and/or other calling features.

To detect improper network activity (and/or, more generally, suspicious activity, questionable activity, disapproved activity, etc.) by a suspected "spoofing" CPE device 170, the example communication system 100 includes the improper usage mitigation system 130 as part of the SIP transaction IPS 116. The example improper usage mitigation system 130 of FIG. 1 functions to detect network activity indicative of improper activity associated with spoofing CPE devices 170. Furthermore, the example improper usage mitigation system 130 functions to notify an OSS via the OSS interface 150 and/or the customer affected by the improper activity so that appropriate measures can be taken to mitigate any detected improper activity. For example, the example improper usage mitigation system 130 may protect against the spoofing CPE device 170 improperly accessing the service platform 120 by employing various hacking/theft techniques to compromise a valid customer's VoIP network service and/or account information.

To provide monitoring capability for the example improper usage mitigation system 130, one or more SIP transaction monitors 134 are deployed as filter(s) to monitor VoIP call usage associated with the service provider service platform 120. For example, SIP communication messages directed to the service platform 120 pass through the SIP transaction IPS 116. The SIP messages are received by one or more SIP interface(s) 132 and passed along to the SIP transaction monitor(s) 134. The SIP interface(s) 132 and/or SIP transaction monitor(s) 134 may be implemented in corresponding VoIP call processors and/or implemented as separate functional units associated with respective VoIP call processors and/or other processing elements in the service provider service platform 120.

In the example implementation, a SIP transaction monitor 134 can perform pre-filtering of a SIP request message to block or allow the request based on a list of IP addresses contained in a watch list 135. If the IP address, the PRID, and/or the PUID of the CPE device originating the SIP request is not contained in the watch list 135, the SIP transaction monitor 134 creates a temporary record of the SIP request. The SIP transaction monitor 134 then links this temporary record to the corresponding SIP response from the service provider service platform to create a transaction record. Additionally, the SIP transaction monitor 134 compares the transaction record to a set of monitoring rules 136. If the transaction record matches at least one of the monitoring rules 136, the transaction record is labeled as a suspicious or questionable transaction record and stored in a transaction cache 138. The SIP transaction monitor 134 then notifies an intrusion detection engine 140 in response to the detected suspicious or questionable transaction record.

Figure 3:
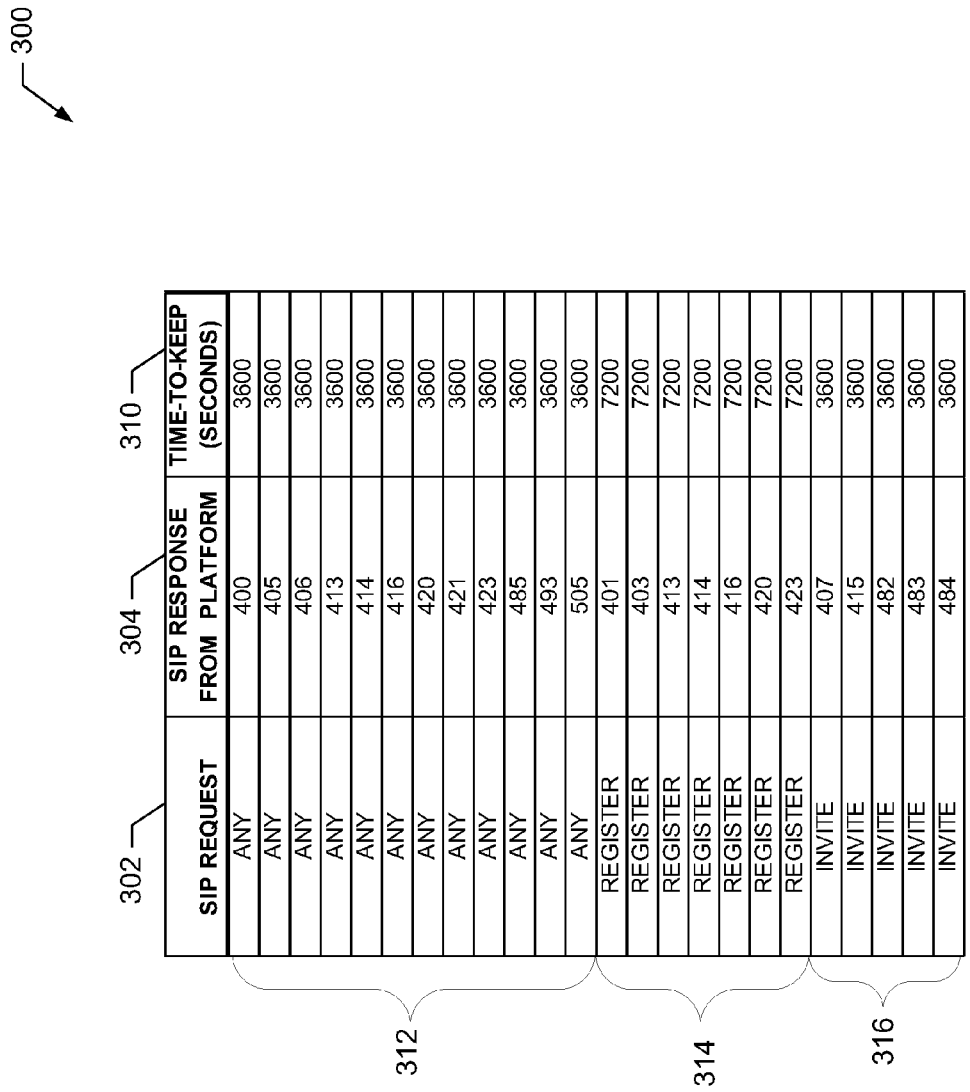
FIG. 3 shows an example set of Monitoring Rules that may be utilized by the example system of FIG. 1.

The monitoring rules 136 included in the example improper usage mitigation system 130 provide criteria in the form of rules and/or policies that enable the SIP transaction monitor(s) 134 to employ a rule-based policy engine to determine whether the monitored network activity should trigger an improper usage notification to the intrusion detection engine 140. The monitoring rules 136 may be managed by a policy rule user interface 156 to enable an operator to create, modify, replace, remove, etc., rules and/or policies. An example set of monitoring rules that may be used to implement the example monitoring rules 136 is illustrated in FIG. 3.

In the example improper usage mitigation system 130, the intrusion detection engine 140 tracks previous suspicious or questionable transaction records as created by the SIP transaction monitor 134. The example intrusion detection engine 140 further identifies hostile devices based on processing the transaction record history according to a set of detection rules 137. Upon notification from the SIP transaction monitor 134 of a new suspicious or questionable transaction record, the intrusion detection engine 140 accesses all transaction records with the same IP address, the same PUID, and/or the same PRID from the transaction cache 138. The intrusion detection engine 140 then deletes any transaction records with elapsed time-to-keep parameters, separates the remaining transaction records into groups of similar records and counts the number of transaction records in each group. Furthermore, the example intrusion detection engine 140 then compares the number of transaction records in each group to criteria specified by the detection rules 137, such as one or more thresholds. If the detection criteria are met, the intrusion detection engine 140 saves all transaction records associated with the IP address, the PRID, the PUID, etc. to an intrusion records repository 142. At this point, the originating CPE device associated with this IP address is identified as hostile. The intrusion detection engine 140 then executes the recommended action specified by the detection rules 137, which may include sending an alert to the OSS interface 150 and/or saving the associated IP address to the watch list 135. Other example recommended actions specified by the detection rules 137 could include, for example, suspending and notifying the originating CPE device, requesting the originating CPE to re-authenticate or re-register, initiating network de-registration of the CPE device, further monitoring the originating CPE device, and/or reporting the originating CPE device to other service provider service platforms.

The detection rules 137 included in the example improper usage mitigation system 130 provide criteria in the form of rules and/or policies that enable the intrusion detection engine 140 to employ a rule-based policy engine to determine hostile IP addresses. The example detection rules 137 include a parameter to instruct the intrusion detection engine 140 to execute a security based function. The example detection rules further include a threshold parameter utilized by the intrusion detection engine 140 to compare the number of suspicious or questionable transaction records. The detection rules 137 may be managed by the policy rule user interface 156 to enable an operator to create, modify, replace, remove, etc., rules and/or policies.

The example communication system 100 of the illustrated example further includes the OSS interface 150. The OSS interface 150 supports fault, configuration, performance, and/or security functions. For example, the OSS interface 150 may include interfaces with various network management systems (NMSs) to provide support across some or all of the example communication network 100. Additionally, the OSS interface 150 of the illustrated example includes service provisioning and/or the policy rule administrative interface(s) 156 to modify the monitoring rules 136, the watch list 135, and/or the detection rules 137. The example OSS interface 150 also includes an intrusion record reviewer 154 to review the intrusion records enabling a manual and/or automatic evaluation of network security threats and/or evidence of hostile attacking to determine changes in policy rules, network configurations, modifications to the SIP transaction IPS 116, etc. The OSS interface 150 may additionally include an attack alert interface 152 to notify network administrator(s) and/or service provider service platform server(s) of an identified hostile attack and the corresponding transaction record details. The administrative interface 156, the intrusion record reviewer 154, and/or the attack alert interface 152 may include graphical user interfaces (GUIs).

In the example improper usage mitigation system 130, an OSS backend of the service provider may record history data of activities performed by the SIP transaction monitor 134, the intrusion detection engine 140, and/or any other functional block within the improper usage mitigation system 130. Service provider network administrator(s) using the OSS interface 150 may access and/or analyze the history data to implement improvements to the SIP transaction monitor 134, the intrusion detection engine 140, and/or any other functional block within the improper usage mitigation system 130.

In an example operation of the SIP transaction IPS 116 in the example communication system 100, a suspected spoofing CPE device 170 attempts to send to the service platform 120 a slow, steady stream of SIP REGISTER messages with a known PUID of a service platform customer CPE device 106 not associated with the spoofing CPE device 170. The first SIP REGISTER message passes through the network security protection 110 to the SIP interface 132, which forwards the message to the SIP transaction monitor 134. The SIP transaction monitor 134 determines the SIP message is a request and checks the originating spoofing CPE device IP address against the watch list 135. In this example, the IP address is not found on the watch list 135 and, thus, the SIP transaction monitor 134 creates a first temporary record of the SIP REGISTER request, including identification information comprising the originating IP address, PUID, PRID transaction ID, the request method, etc. The SIP transaction monitor 134 then forwards the SIP REGISTER message to the service provider service platform 120. In this example, the service platform 120 detects the SIP REGISTER message is incorrect and returns a SIP 403 error response. The SIP response message is sent back to the SIP transaction monitor 134 where the SIP transaction monitor 134 links the SIP 403 error response to the previously created temporary record to create a transaction record. The SIP transaction monitor 134 then compares the transaction record to the monitoring rules 136. In this example, there is a match indicating the transaction record is suspicious or questionable. As a result, the SIP transaction monitor 134 saves the transaction record to the transaction record cache 138. The SIP transaction monitor 134 then sends a notification of the suspicious or questionable transaction record to the intrusion detection engine 140 and forwards the response from service platform 120 back to the spoofing CPE device 170.

The intrusion detection engine 140 then receives the IP address of the spoofing CPE device 170 and accesses all transaction records in the transaction record cache 138 with the same IP address. In one possible example, the spoofing CPE device 170 has made previous attempts to attack the service provider service platform 120. The intrusion detection engine 140 compiles all transaction records in the transaction record cache 138 with the same IP address and/or the same PUID and counts the number of similar transactions. The intrusion detection engine 140 then compares the type and amount of transaction records to detection criteria specified by the detection rules 137.

In a first example, assume that the new transaction record is sufficient to reach a detection rule threshold within the observation window time period with an action parameter of blocking. The intrusion detection engine 140 then adds the IP address of the spoofing CPE device 170 to the watch list 135 to prevent any future attempts from the spoofing CPE device 170 to access the service platform 120. In addition, the intrusion detection engine 140 adds all of the transaction records having an IP address associated with the spoofing CPE device 170 to the intrusion records repository 142 and sends an alert to the attack alert interface 152.

In a second example, assume that the suspicious transaction record is the first record from the spoofing CPE device 170. The intrusion detection engine 140 attempts to access the corresponding transaction records in the transaction cache 138. Assuming that this first transaction record does not cause the detection threshold(s) to be exceeded, the intrusion detection engine 140 takes no action and waits for the next notification from the SIP transaction monitor 134.

Thus, the SIP transaction IPS 116, including the SIP transaction monitor 134, the intrusion detection engine 140, the monitoring rules 136, the watch list 135, the detection rules 137 and the intrusion record repository 142, is capable of supporting any or all of the following policies for a spoofing CPE device: (1) block, (2) allow, (3) log and take no action, (4) auto-alert, (5) auto-block, etc. For the block policy, the SIP transaction monitor 134 rejects a request from a CPE device when the originating CPE device IP address or other corresponding identification information is contained in the watch list 135 as a blocked CPE device. For the allow policy, the SIP transaction monitor 134 grants a request from a CPE device when the originating CPE device IP address or other corresponding identification information is contained in the watch list 135 as an allowed CPE device. The allow policy enables network operators and customer care representatives to correct false positive alarms for legitimate CPE devices that may exhibit suspicious access behaviors due to, for example, provisioning errors. For the log and take no action policy, the SIP transaction monitor 135 stores the questionable transaction record when the corresponding identification information is not contained in the watch list 135 and the intrusion detection engine 140 updates the threshold counter to track future occurrences of similar types of questionable or suspicious transaction records but performs no action in response to the detected suspicious or questionable transaction record. For the auto-alert policy, the SIP transaction monitor 134 stores the suspicious or questionable transaction record, the intrusion detection engine 140 determines that a threshold counter has exceeded at least one detection rule threshold, and sends an automatic alert to the attack alert interface 152.

For the auto-block policy, the intrusion detection engine 140 blocks access to the communication network 100 from the suspect device (e.g., the spoofing CPE device 170). The auto-block policy may occur in response to evaluating the received activity alert according to the detection rules 137, and/or if a threshold counter tracking a particular type of suspicious or questionable transaction record exceeds a detection rule threshold resulting in an "exceeded threshold" condition. Once network access is suspended, the suspect device cannot re-register with the example communication network 100 absent intervention by, for example, a network custodian to rehabilitate the device (e.g., by resetting the suspended account associated with the suspect device).

The improper usage mitigation system 130 of the illustrated example supports the escalation of responses to suspicious and/or potentially improper network activity based on the perceived severity of the received activity alert. In particular, the example improper usage mitigation system 130 of FIG. 1, through the automatic security checking capability provided by the SIP transaction monitor 134 and intrusion detection engine 140, can react to suspicious network activity using automatic account verification procedures without requiring potentially costly human intervention by network operators and/or the affected customer. As such, the automatic security checking capability provided by the SIP transaction monitor 134 and intrusion detection engine 140 allows the example improper usage mitigation system 130 of FIG. 1 to be sensitive and responsive to suspicious network activity without increasing the probability of false alarms because ambiguities regarding whether or not the suspicious activity corresponds to improper activity can be clarified through the validation and disconnect procedures implemented by the SIP transaction monitor 134 and the intrusion detection engine 140. Validation includes requesting a re-registration by the suspicious CPE device. Disconnect procedures include initiating a de-registration of the CPE device.

Figure 2:
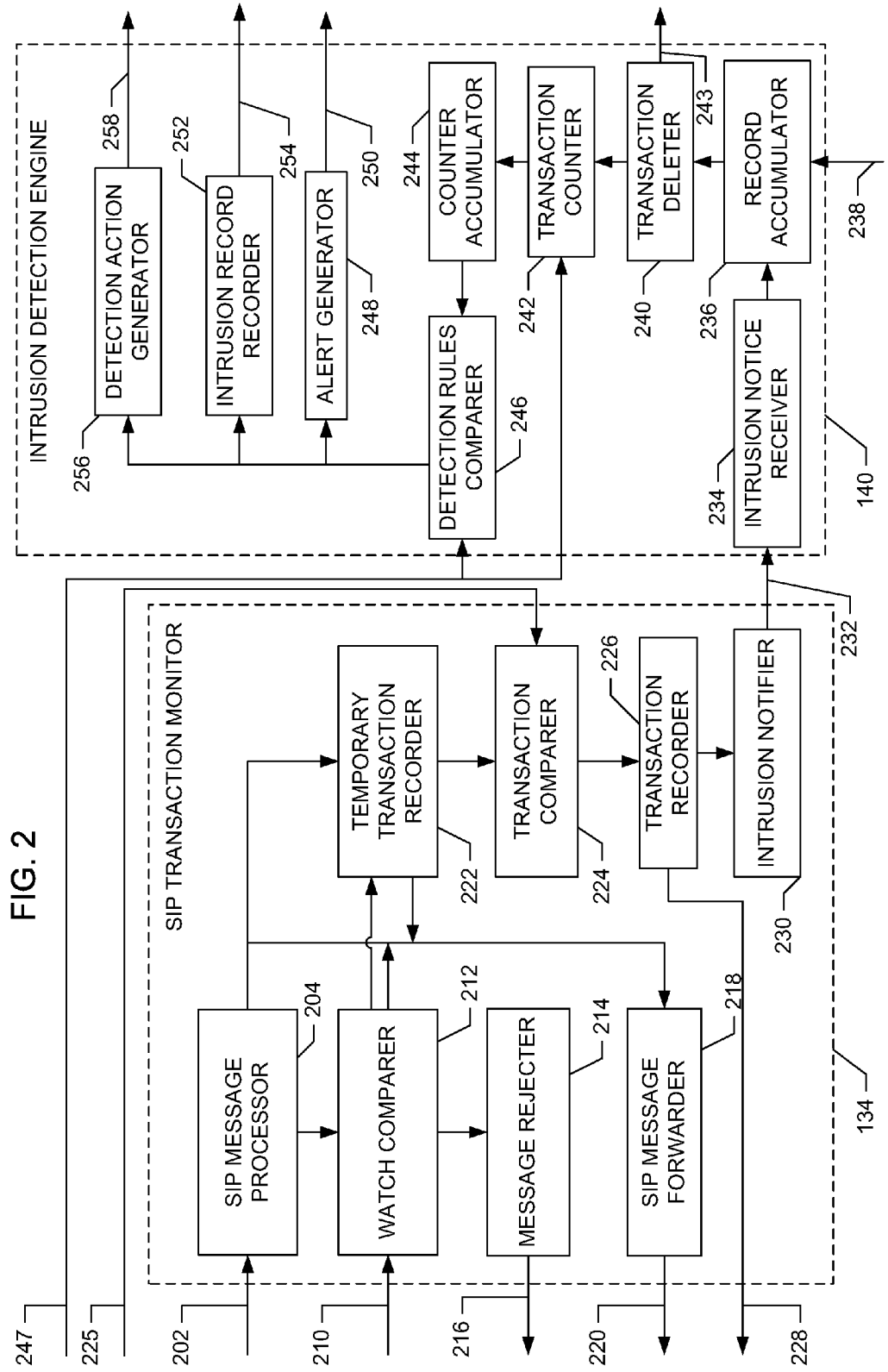
FIG. 2 is a block diagram of an example Session Initiation Protocol (SIP) Transaction Monitor and Intrusion Detection Engine, that may be used to implement the example system of FIG. 1.

FIG. 2 shows an example functional block diagram of the SIP transaction monitor 134 and the intrusion detection engine 140 of FIG. 1. The SIP transaction monitor 134 may include a SIP message processor 204, a watch comparer 212, a message rejecter 214, a SIP message forwarder 218, a temporary transaction recorder 222, a transaction comparer 224, a transaction recorder 226, and/or an intrusion notifier 230. Although the SIP transaction monitor 134 is described as having one of each block described below, the SIP transaction monitor 134 may be provided with two or more of any block described below. In addition, some blocks may be disabled, omitted, duplicated, or combined with other blocks.

In the example implementation, the SIP message processor 204 receives a SIP message 202 from the SIP interface 132 of FIG. 1. The SIP message processor 204 is configured to route incoming SIP messages within the SIP transaction monitor 134. For example, the SIP message processor 204 forwards SIP responses from the service platform 120 to the temporary transaction recorder 222. If the SIP message 202 is a SIP request from a CPE device, the SIP message processor 204 sends the message to the watch comparer 212. If the SIP message 202 is not a SIP response from the service platform or a SIP request from a CPE device, the SIP message processor 204 sends the SIP message to the message forwarder 218. SIP requests may include NOTIFY, INVITE, REGISTER, SUBSCRIBE, or any other SIP message that originates from a CPE device and/or service platform to initiate and/or change the status within a communication network. SIP responses may include 200 (OK), 403 (FORBIDDEN), 406 (NOT ACCEPTABLE), 503 (SERVICE UNAVAILABLE), or any other SIP message that originates from a CPE device and/or service platform to communicate a response to a SIP request. Additionally, SIP messages may be recognized as a SIP response and/or SIP request by, for example, Request for Comments (RFC) 3261, RFC 3265, or any other standards or telecommunication organization.

The watch comparer 212 receives SIP request messages from the SIP message processor 204 and checks 210 the identification information included in the SIP request messages with the watch list 135. The watch comparer 212 may perform one of three actions: (1) BLOCK, (2) ALLOW, (3) MONITOR based on the watch list. In the BLOCK action, if the watch list 135 contains the IP address included in a SIP request message and an action parameter is set to BLOCK, the watch comparer 212 sends a reject notice to the message rejecter 214. The BLOCK notice may include the SIP request message. The message rejecter 214 receives the BLOCK notice from the watch comparer 212 and blocks the SIP request by deleting the SIP request. Additionally the message rejecter 214 may send a response 216 to the corresponding CPE device indicating the attempts to access the service platform 120 have been rejected.

In the ALLOW action, the watch list 135 contains the CPE device IP address and a corresponding action parameter set to a value of ALLOW. In this case, the watch comparer 212 sends an ALLOW notice to the SIP message forwarder 218. The ALLOW notice may include the SIP request message. IP addresses associated with the action parameter of ALLOW may have specifically been set manually to ALLOW by a network administrator or automatically by the service platform 120. The SIP message forwarder 218 receives the ALLOW notice from the watch comparer 212 and transmits 220 the SIP request message to the service platform 120.

In the MONITOR action, the watch comparer 212 notifies the temporary transaction recorder 222 if the watch list 135 does not contain the IP address included in the SIP request. The temporary transaction recorder 222 creates a temporary record of the device request message including the transaction ID, originating device IP address, PUID, PRID, and SIP request method. The temporary transaction recorder 222 saves the temporary transaction record until the corresponding SIP response from the service platform 120 is received by the SIP message processor 204. The temporary transaction recorder 222 may continue processing other temporary transaction records including other SIP responses. Additionally, in the case the corresponding SIP response is not received after a time period such as, for example, 64 seconds, the temporary transaction recorder 222 deletes the temporary transaction record. When a SIP response from the service platform is received by the temporary transaction recorder 222, the temporary transaction recorder 222 sends the SIP response to the SIP message forwarder 218. The SIP message forwarder 218 transmits the SIP response to the SIP interface 132, which forwards the SIP response message to the service access networks 108, and back to the originating CPE device. Additionally, the temporary transaction recorder 222 links the SIP response to the corresponding temporary transaction record creating containing the SIP request, to create a transaction record. The temporary transaction recorder 222 sends the transaction record to the transaction comparer 224.

In the example implementation of the SIP transaction monitor 134, the transaction comparer 224 compares the transaction record to the list of monitoring rules 136. The transaction comparer 224 is configured to either delete the transaction record or forward the transaction record to the transaction recorder 226. The transaction comparer 224 accesses 225 the monitoring rules 136 and compares the information included in the transaction record to parameters within the monitoring rules 136. If the transaction record does not match at least one of the monitoring rules 136, the transaction comparer 224 deletes the transaction record. If the transaction record matches at least one monitoring rule, the transaction comparer 224 sends the transaction record to the transaction recorder 226. At this point, the transaction record and corresponding IP address is deemed suspicious or questionable. The transaction recorder 226 saves the transaction record to the transaction record cache 138 and sends a message to the intrusion notifier 230. The intrusion notifier 230 within the SIP transaction monitor 134 sends a notification 232 to an intrusion notice receiver 234 within the intrusion detection engine 140. The notification may contain the IP address of the originating device and/or the suspicious or questionable transaction record.

In the example block diagram of FIG. 2, the intrusion detection engine 140 may include the intrusion notice receiver 234, a record accumulator 236, a transaction deleter 240, a transaction counter 242, a counter accumulator 244, a detection rules comparer 246, an alert generator 248, an intrusion record recorder 252, and a detection action generator 256. Although the intrusion detection engine 140 is described as having one of each block described below, the intrusion detection engine 140 may be provided with two or more of any block described below. In addition, some blocks may be disabled, omitted, duplicated, or combined with other blocks.

In the example implementation, the intrusion notice receiver 234 is configured to receive a notification from the intrusion notifier 230 of a suspicious or questionable transaction record. Additionally, the intrusion notice receiver 234 forwards the transaction record to the record accumulator 236. The record accumulator 236 accesses 238 the transaction cache 138 and collects all transaction records with the originating device IP address as the one contained in the notification from the intrusion notice receiver 234. The record accumulator 236 then forwards the collected transaction records to the transaction deleter 240. The transaction deleter 240 deletes the collected transaction records that are older than a time-to-keep parameter included in the transaction record. The transaction deleter 240 then sends a message 243 to the transaction cache 138 identifying the transaction records that should be deleted. The transaction deleter 240 forwards the remaining transaction records to the transaction counter 242.

The transaction counter 242 matches the transaction records to detection criteria by via 247 the detection rules 137 and counts the number of suspicious or questionable transaction records that match the detection criteria for each detection rule. For example, all transaction records with a device SIP request type of INVITE, a SIP response type of 406, and a PUID-PRID correlation field value of YES may be summed together by the transaction counter 242. The transaction counter 242 then forwards the number of transaction records per detection rule to the counter accumulator 244. The counter accumulator 244 groups the number of transaction records matching each detection rule. Additionally, the counter accumulator 244 forwards the count information to the detection rules comparer 246. The detection rules comparer 246 compares the number of transaction records to the frequency criteria fields via 247 the detection rules 137. For each detection rule, the detection rules comparer 246 compares the counted number of transaction records matching the detection rule to the frequency threshold specified within the detection rule. For example, a detection rule may specify a frequency threshold of 10 questionable transaction records detected within an observation window of 20 seconds. If the number of transaction records per detection rule fail to exceed and/or equal the frequency criteria, the detection rules comparer 246 resets the intrusion detection engine 140 to wait for the next notification from the SIP transaction monitor 134.

However, if the number of transaction records per detection rule exceeds and/or equals the frequency criteria, the detection rules comparer 246 checks the action parameter associated with the corresponding detection rule. In this example implementation, if the action parameter within the detection rule is ALERT, the detection rules comparer 246 will forward all transaction records to the intrusion record recorder 252 and send an alert message to the alert generator 248. The intrusion record recorder 252 saves all transaction records to the intrusion record repository 142. The alert generator 248 sends 250 an alert message to the attack alert interface 152 to warn, for example, a network operator and/or administrator that an intrusion attempt is underway against the service provider service platform 120. If the action parameter within the detection rule is BLOCK, the detection rules comparer 246 will send the corresponding IP address to the detection action generator 256, and forwards all transaction records to the intrusion record recorder 252 and an alert message to the alert generator 248. The detection action generator 256 saves 258 the IP address, the PUID, and/or the PRID to the watch list 135. The intrusion record recorder 252 saves 254 the received transaction records to the intrusion record repository 142.

The preceding description describes the functional blocks in a series relationship. However, in other example functional block implementations, the SIP transaction monitor 134 and/or intrusion detection engine 140 may perform some or all processing in parallel. For example, if one suspicious or questionable transaction record is compared in the transaction comparer 224 at substantially the same time the watch comparer 212 may be checking a device request from a different device unrelated to the transaction record being processed by the transaction comparer 224.

FIG. 3 illustrates an example implementation of the monitoring rules 136 described in FIG. 1. The monitoring rules 136 may be stored in a monitoring rules hash table 300 containing rule criteria 302-310 and a list of individual rules 312-316. In this example implementation, each rule 312-316 included in the monitoring rules hash table 300 includes a SIP request field 302, a SIP response field 304, and a time-to-keep field 310. In this example, each monitoring rule is formed by specifying a value for each field. The SIP request field 302 and the SIP response field 304 are rule fields while the time-to-keep field 310 contains a time value associated with the rule fields. In this example, the monitoring rules hash table 300 contains only two rule fields to minimize the number of fields the SIP transaction monitor 134 checks for each SIP transaction record. The lower the number of fields within the monitoring rules hash table 300, the less intrusive the SIP transaction monitor 134 may be on the transmission speeds of the SIP messages between CPE devices and the service platform 120.

In the example implementation of the monitoring rules hash table 300, the SIP request field 302 includes types of SIP requests that may originate from a CPE device. The SIP response field 304 includes types of SIP responses that originate from the service platform 120 in response to a respective SIP request from a CPE device. The time-to-keep field 310 is a value that indicates the length of time a transaction record that matches a monitoring rule should be saved in the transaction record cache 138. The value may be defined by a network administrator based on history data of past network security attacks.

In the example implementation of the monitoring rules hash table 300, the monitoring rules 312-316 are organized according to the SIP request type. For example, the monitoring rules 312 correspond to the SIP request field 302 type of ANY, the monitoring rules 314 correspond to the SIP request field 302 type of REGISTER, and the monitoring rules 316 correspond to SIP request field 302 type of INVITE. In the same manner, the monitoring rules hash table 300 may be organized according to the SIP response field 304 type. The monitoring rules hash table 300 includes only an example set of monitoring rules 312-316. Additionally or alternatively, in other implementations the monitoring rules hash table 300 may contain additional monitoring rules or fewer monitoring rules.

In this example implementation, a transaction record must pass all criteria in at least one of the monitoring rules 312-316 to be considered suspicious or questionable. For example, the first row within the monitoring rules 314 includes a REGISTER value within the SIP request field 302, a '401' value within the SIP response field 304, and a 7200 value within the time-to-keep field 310. When there is a SIP request of REGISTER from a CPE device and a resulting '401' SIP response from the service platform 120, both monitoring rule criteria are met resulting in the transaction record being labeled as questionable (e.g., worth watching) or suspicious. Additionally, the corresponding transaction record is stored in the transaction record cache 138 for the 7200 seconds in the corresponding time-to-keep field 310 value. In another example, if there is a SIP request of REGISTER from a CPE device and a resulting '503' SIP response from the service platform 120, the transaction record is not be labeled as suspicious or questionable because a match cannot be made with at least one monitoring rule. In a second example implementation, the transaction record may be considered suspicious or questionable if the transaction record meets at least one criterion in at least one of the monitoring rules 312-326. For example, if a transaction record contains a SIP response of '405' the transaction record may be considered suspicious or questionable regardless of the SIP request.

FIG. 4 shows an example implementation of the watch list 135 described in FIG. 1. The watch list 135 may be implemented as a watch list hash table 400 containing CPE device identification fields 402 and 406-412, and a watch list action field 404. The watch list hash table 400 includes four example list entries 414-417 from corresponding to CPE devices. The implementation of the watch list hash table 400 may be configured to optimize the performance of searches, insertions, and deletion of elements in the list. In this example implementation, the watch list hash table 400 contains fields for the originating IP address field 402, the watch list action field 404, the PRID field 406, the PUID field 408, a timestamp parameter 410, and a time-to-keep watch list field 412. Each watch list entry is formed by specifying a parameter for each field. In the example, the watch list entry 414 contains an asterisk '* (ANY)' for the PRID field 406 and the PUID field 408 fields. This means that SIP requests from the originating IP address of the CPE device (i.e. address 202.181.93.101) will be blocked regardless of the PUID within the SIP request or the PRID associated with the PUID.

In the example implementation of the watch list hash table 400, the originating IP address field 402 stores the CPE device IP address. The PUID field 408 stores the PUID sent by the CPE device in the SIP request. The PRID field 406 stores the PRID associated with the stored PUID. The timestamp parameter 410 saves the time the watch list entry was saved to the watch list 135. The time-to-keep watch list field 412 stores a value used by the OSS interface 150 and/or watch list 135 to delete watch list entries after time-to-keep watch list field 412 expires if the corresponding watch list action field 404 contains a BLOCK action. If the watch list action field 404 contains an ALLOW action, the time-to-keep watch list field 412 stores a value used by the OSS interface 150 and/or watch list 135 to specifically allow network access for the corresponding IP address within the originating IP address field 402 for the length of time specified within the time-to-keep watch list field 412 without subjecting the CPE device associated with the IP address to the SIP IPS monitoring and detection policies.

The watch list action field 404 contains action parameters corresponding to actions performed by the watch comparer 212 in the SIP transaction monitor 134 based on a match with the originating IP address field 402, the PRID field 406, and the PUID field 408. In this example implementation, the watch list entries 414 and 417 include a BLOCK value within the watch list action field 404 and watch list entries 415 and 416 include an ALLOW value within the watch list action field 404. This means that if the watch comparer 212 determines a SIP request message matches an IP address within the originating IP address field 402, a PRID within the PRID field 406, and a PUID within the PUID field 408, and the corresponding watch list action field 404 includes the BLOCK value, the SIP request from the CPE device will be blocked. If the SIP transaction monitor 134 determines a SIP request message matches an IP address within the originating IP address field 402, a PRID within the PRID field 406, and a PUID within the PUID field 408, and the corresponding watch list action field 404 includes the ALLOW value, the SIP request from the CPE device will be granted permission to continue to the service platform 120. If the SIP transaction monitor 134 determines a SIP request message does not match an IP address within the originating IP address field 402, a PRID within the PRID field 406, and a PUID within the PUID field 408, the SIP request is forwarded to the service platform 120, and the SIP transaction monitor 134 creates a temporary record until a SIP response is received. The watch list action field 404 may include additional action types such as, for example, ALERT, MONITOR, INSTRUCT, etc.

In this example, a SIP request must pass all the criteria in at least one watch list entry to enable the SIP transaction monitor 134 to perform the action specified in the watch list action field 404. In other example implementations, a SIP request may only have to meet one of the criteria within the watch list hash table 400 to enable the SIP transaction monitor 134 to perform the action specified in the watch list action field 404. For example, if a SIP request message from a CPE device includes an IP address that matches an IP address within the originating IP address field 402 but the PUID and PRID associated with the SIP request message from the CPE device does not match the corresponding PRID value and PUID value within the entry, the action within the list action field 404 is performed.

FIG. 5 is an example implementation of the transaction record cache 138 of FIG. 1. The transaction record cache 138 may be implemented as a transaction record cache hash table 500 containing CPE device identification 506, transaction record fields 508-514, and a list of individual transaction records 516-522. The implementation of the transaction record cache hash table 500 may be configured to optimize the performance of searches, insertions, and deletion of elements in the list. In this example implementation, the transaction record cache hash table 500 contains fields for the originating IP address parameter 502, the PRID field 504, the PUID field 506, the SIP request type 508, the 510 SIP response type, a timestamp parameter 512, and a time-to-keep parameter 514. In this example implementation, each transaction record is formed by specifying a parameter for each field.

In the example implementation of the transaction record cache hash table 500, the originating IP address parameter 502 stores the requesting CPE device IP address. The PUID field 506 stores the PUID sent by the CPE device in the SIP request. The PRID field 504 stores the PRID associated with the stored PUID. The SIP request field 508 stores the request type from the CPE device. The SIP response field 510 stores the type of SIP response from the service platform 120 corresponding to a SIP request from a CPE device. The timestamp parameter 512 stores the time the transaction record was saved to the transaction record cache 138 by the transaction recorder 226 of FIG. 2. The time-to-keep parameter 514 stores a value received from the monitoring rules hash table 300 corresponding to the value within the time-to-keep field 310 associated to the monitoring rule violated by a transaction record. For example, if a transaction record meets the criteria of a monitoring rule with a 7200 value within the corresponding time-to-keep field 310, the time-to-keep parameter 514 stores the 7200 value in the same entry as the corresponding transaction record. The time-to-keep parameter 514 is used by the intrusion detection engine 140 to delete transaction records whose time stamp is older than the time-to-keep parameter 514.

FIG. 6 is an example implementation of the detection rules 137 of FIG. 1. The detection rules 137 may be stored in a detection rules hash table 600 containing rule criteria 602-609 and the list of individual rules 610-616. In this example implementation, the monitoring rules hash table 600 contains a SIP request field 602, a SIP response field 604, a PUID-PRID-IP correlation field 605, a transaction record threshold 606, an observation window field 607, a detection rules action parameter 608, and an action time field 609. In this example, each detection rule is formed by specifying a parameter for each field.

The detection rules hash table 600 includes the SIP request field 602 which stores the SIP request type from the CPE device. The SIP response field 604 field stores the type of SIP response from the service platform 120 corresponding to a SIP request from a CPE device. The transaction record threshold 606 field stores a detection rule parameter that enables the intrusion detection engine 140 to compare the accumulation of transaction records with the specified SIP request field 602 and SIP response field 604 from the same originating IP address. The threshold value may be defined by, for example, a network administrator and/or by the service platform 120 based on history data of past network security incursions.

The PUID-PRID-IP correlation field 605 examines the PUID, PRID, and IP address from a CPE device in a newly stored transaction record to previous transaction records in the transaction records cache 138 to determine if the PUID and PRID match, but the IP addresses are different. If there is a difference, the PUID-PRID-IP correlation field 605 flags this difference with a YES value, otherwise the field value is assigned a NO. This field may be utilized by the intrusion detection engine 140 to determine if a potential spoofing CPE device 170 with a PRID and PUID is attempting to use different IP addresses to improperly access a network. For transaction records with the same SIP request and SIP response the other detection rule criteria can vary based on the value in the PUID-PRID-IP correlation field 605. For example, a detection rule with a SIP request of REGISTER, a SIP response of 401, and a PUID-PRID-IP correlation field 605 value of YES corresponds to a transaction threshold value of 10 and an observation window value of 20 while a detection rule with the SIP request of REGISTER, the SIP response of 401, and a PUID-PRID-IP correlation field 605 value of NO corresponds to a transaction threshold value of 60 and an observation window value of 1800. The detection rules 137 with a PUID-PRID-IP correlation field 605 value of YES are used to quickly identify and respond to attacks. For these rules, the transaction threshold values and the observation window values are lower than detection rules with the same SIP response and SIP request but with PUID-PRID-IP correlation field 605 values of NO. For example, a legitimate CPE device does not generate many of the same SIP requests with different originating IP addresses in a small observation window. Thus, a circumstance where a CPE device generates many of the same SIP requests with different originating IP addresses (i.e., PUID-PRID-IP correlation field 605 value of YES) is regarded as an application level DDOS attack.

The observation window field 607 stores a transaction record frequency threshold value. The value is defined such that the transaction counter 242 will count transaction records whose time stamps fall within the last observation time window for the number of occurrences of the same request/response pair with either the same PUID, PRID, and IP address or the same PUID and PRID but different IP address. The intrusion detection engine 140 may use this value to determine if transaction records within the transaction record cache 138 from the same CPE device are being transmitted at a greater or equal frequency to the defined frequency threshold value within the specified observation time window. For example, the intrusion detection engine 140 may determine a CPE device is hostile if an evaluation of the transaction records within the transaction records cache 138 reveals the CPE device is sending SIP REGISTER requests using different IP addresses that are being responded to with a '401' SIP response from a service platform 120 at a rate of at least 10 SIP responses in 20 seconds if the frequency threshold criteria corresponding to the detection rule is 10 responses in 20 seconds.

The detection rules action parameter 608 contains actions preformed by the intrusion detection engine 140 when there is a match to a detection rule. In this example implementation, detection rule entry 610 includes a detection rule action value of BLOCK. If there is a match to the detection rule, the intrusion detection engine 140 performs actions to block the originating IP address of a CPE device. This may include adding the IP address to the watch list 135 with a watch list action field 404 of BLOCK, sending an alert to the OSS interface 150 and/or the service platform 120 servers, and/or saving all the transaction records with the originating device address to the intrusion record repository 142. Some detection rule entries within detection rules 614-616 include a detection rule action parameter of ALERT. If there is a positive match to at least one of these detection rules, the intrusion detection engine 140 can perform the actions necessary to alert the network about the network intrusion. This may include sending an alert to the OSS interface 150 and/or saving all the transaction records with the originating device address to the intrusion record repository 142. The detection rule action parameters 608 may include additional action types as determined by, for example, network administrators. The action time field 609 includes values that are used by the time-to-keep watch list field 412 within the watch list hash table 400. For example, if a CPE device meets the criteria of a detection rule with a detection rules action parameter 608 value of BLOCK and a action time field 609 of 48 hours, the CPE device is added to the watch list hash table 400 to be blocked for 48 hours. The action time field 609 may be defined by, for example, a network administrator based on history data of past network security incursions.

In this example implementation, an accumulation of transactions from the same originating IP address must pass all the criteria in at least one detection rule for the associated CPE device to be considered hostile. For example, an accumulation of transaction records may meet the criteria of the SIP request field 602, and the service platform SIP response field 604, but the number of transaction records does not meet the count within the observation time window and the transaction record threshold. Thus, the detection rule is not met and the originating CPE device is not labeled as hostile or considered an intrusion to network security. In a second example implementation, the accumulation of transaction records may be considered an intrusion or hostile if the accumulation of transaction records meets at least one criterion in at least one detection rule. For example, if an accumulation of transaction records contains a SIP request of REGISTER and a SIP response of '403,' and the transaction record count is 12 in the 20 second observation window that matches the criteria in a detection rule (second line in 614), then the accumulation of transaction records from the originating CPE device may be considered an intrusion or hostile to network security.

Figure 7A:
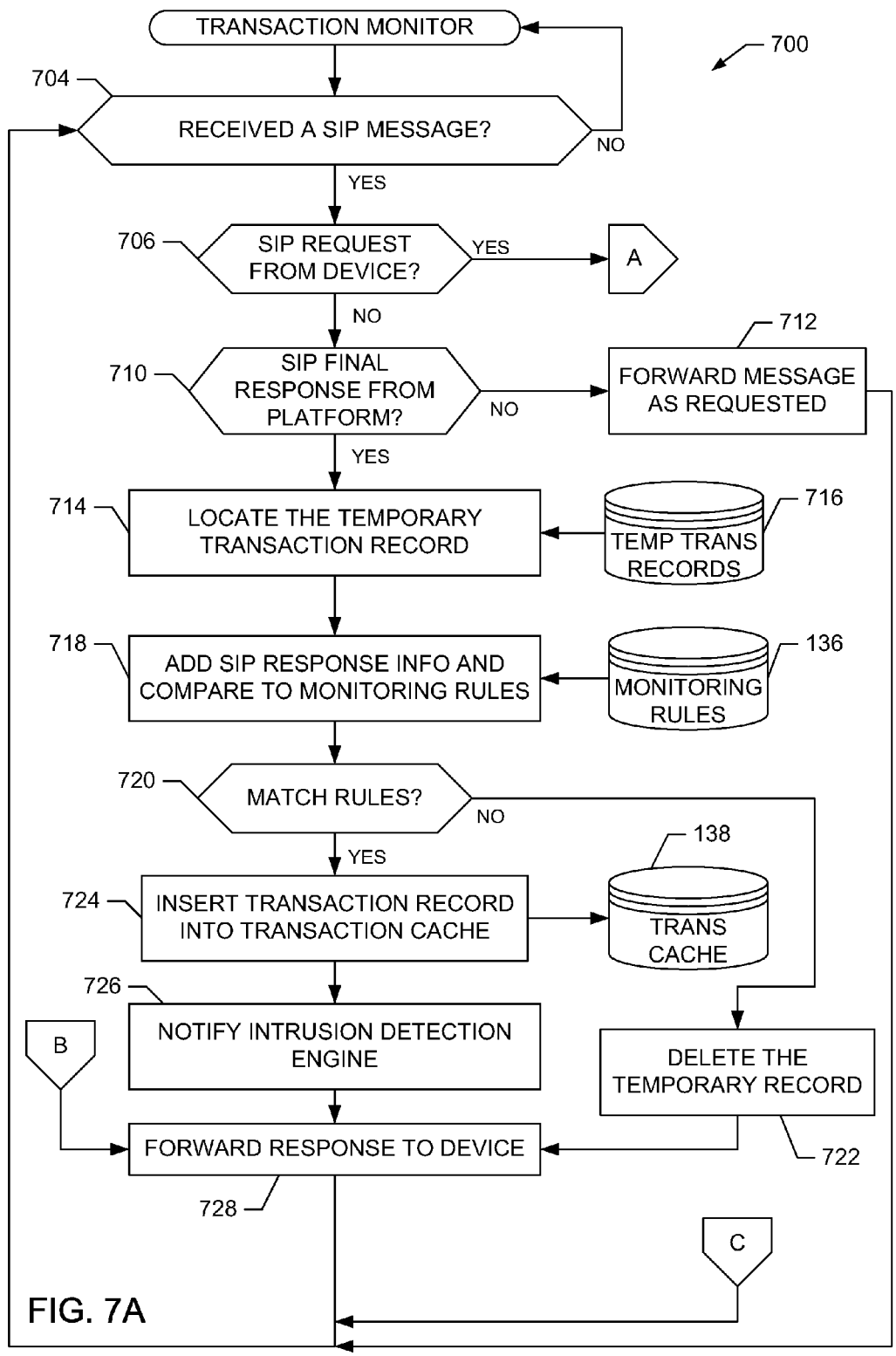
FIGS. 7A and 7B collectively are flowcharts representative of example machine readable instructions that may be executed to implement the example SIP Transaction Monitor of FIG. 2.
Figure 7B:
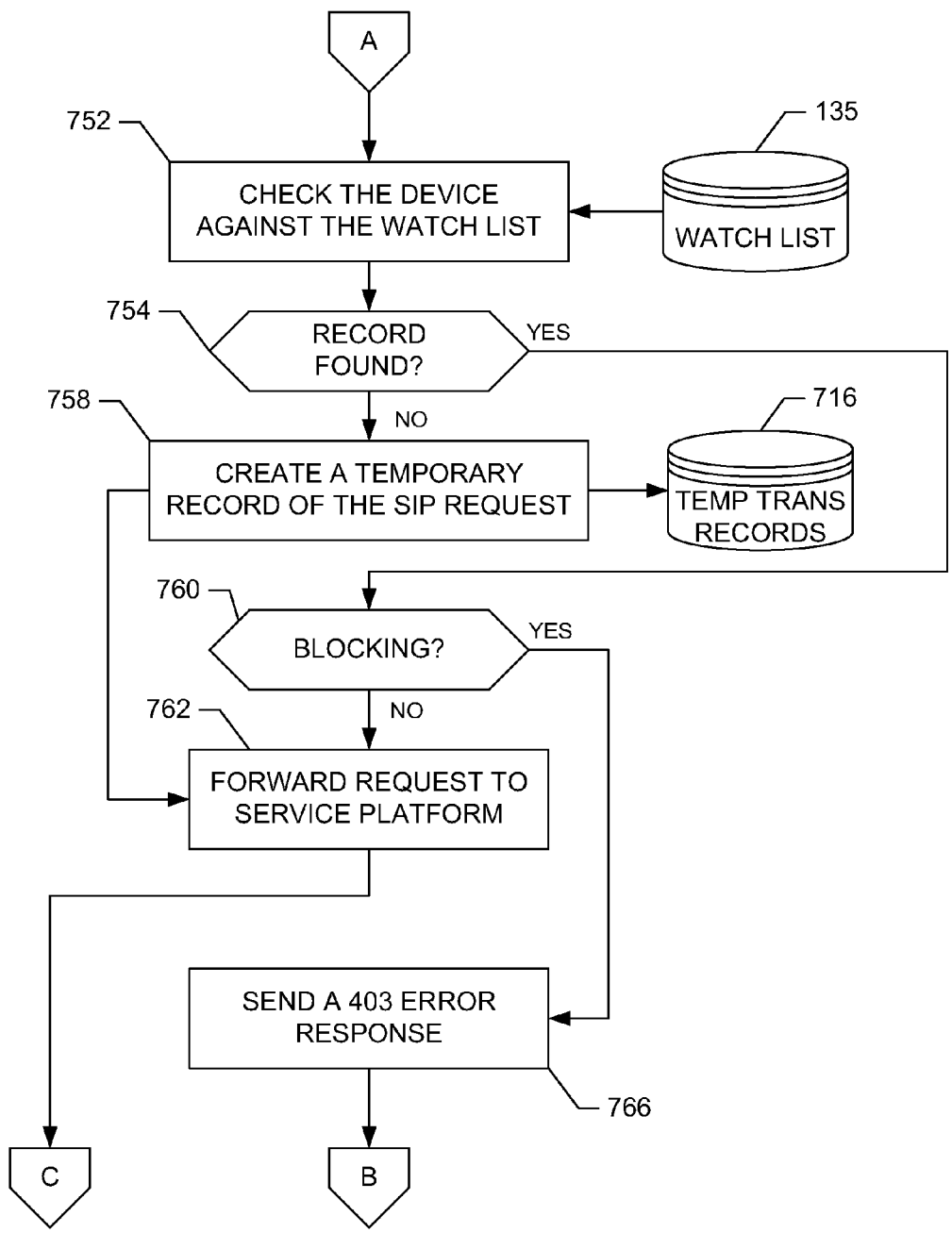
Figure 8:
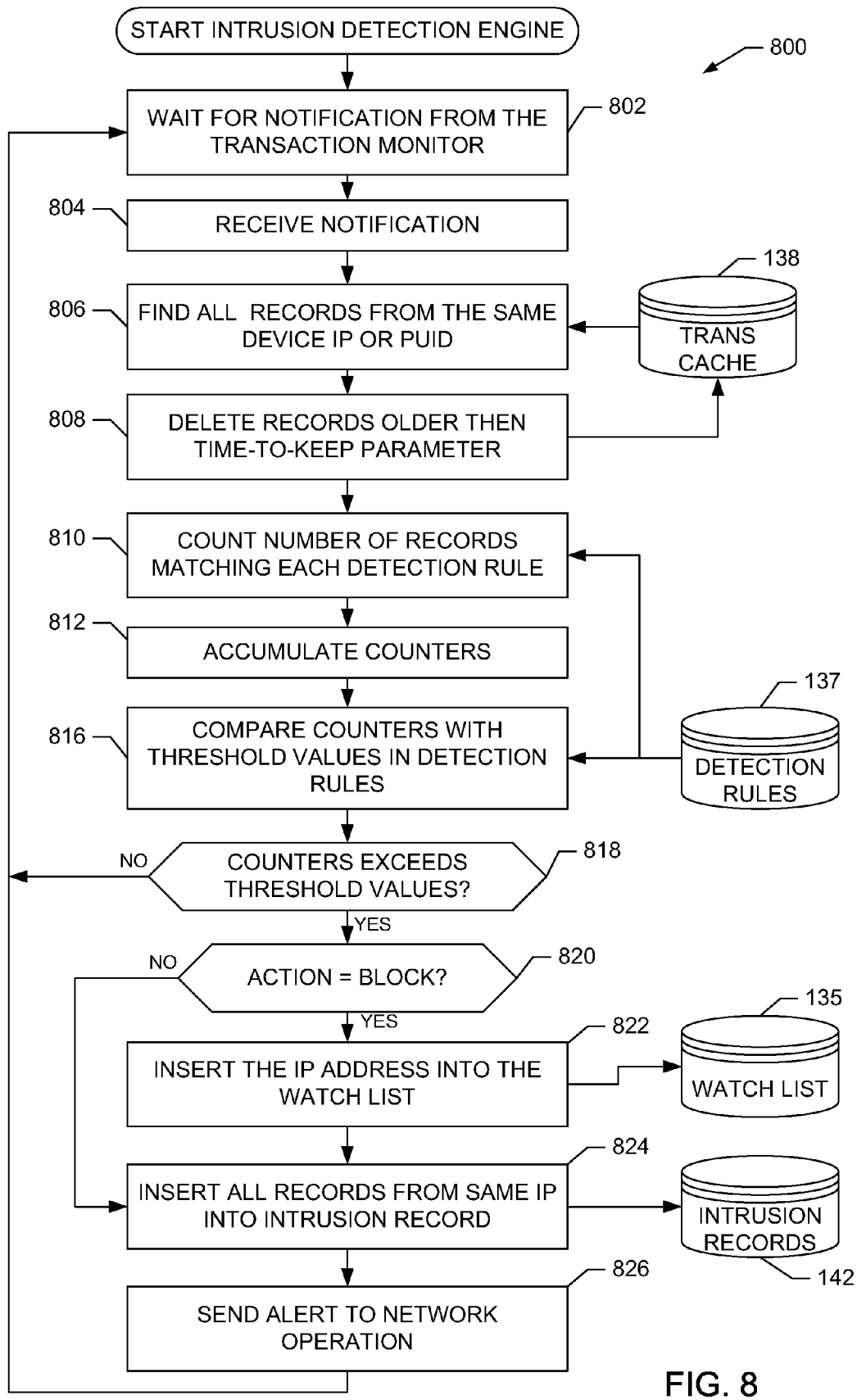
FIG. 8 is a flowchart representative of example machine readable instructions that may be executed to implement the Intrusion Detection Engine of FIG. 2.

FIGS. 7A, 7B, and 8 are flowcharts representative of example machine readable instructions that may be executed to mitigate improper network usage to implement the example SIP transaction IPS 116 of FIG. 1. Although the example machine readable instructions are described with reference to the flowcharts of FIGS. 7A, 7B, and 8, other methods of mitigating improper network usage, implementing the example SIP transaction IPS 116 of FIG. 1 may additionally or alternatively be used. For example, the order of execution of the blocks depicted in the flowcharts of FIGS. 7A, 7B, and 8 may be changed, and/or some of the blocks described may be rearranged, eliminated, or combined. Although for simplicity of illustration, the blocks of FIGS. 7A, 7B, and 8 are shown as progressing serially in time, any or all of the blocks may be executed in parallel. For example, multiple threads may be spawned executing multiple instances of some or all of the blocks to effectively monitor for and analyze SIP messages.

Example machine readable instructions 700 that may be executed to implement the example SIP transaction monitor 134 of FIGS. 1 and/or 2 are shown in FIGS. 7A and 7B. The example machine readable instructions 700 may be executed at predetermined intervals, based on an occurrence of a predetermined event, etc., or any combination thereof. For example, the machine readable instructions 700 may be executed upon start-up of the SIP transaction monitor 134, at predetermined intervals, such as hourly, daily, etc. Additionally or alternatively, the example machine readable instructions 700 may be executed upon the occurrence of a trigger generated remotely, for example, at the improper user mitigation system 130 whenever a network security protection 110 is activated, processes communication information, etc.

The example machine readable instructions 700 begin execution at block 704 of FIG. 7A, at which the SIP transaction monitor 134 of FIGS. 1 and/or 2 waits for a SIP message. If, in block 704 the SIP transaction monitor 134 receives a SIP message forwarded by the SIP interface 132, control passes to blocks 706 and 710, at which the SIP transaction monitor 134 determines if the SIP message is a SIP request from a CPE device or SIP response from the service platform 120. In another example implementation, the SIP transaction monitor 134 copies the SIP message, forwards the SIP message to the intended destination, and processes the copy of the SIP message in blocks 706 and 710.

If the SIP message is a SIP request from a device, control proceeds to block 752 of FIG. 7B, at which the SIP transaction monitor 134 determines if the identification information in the SIP request message matches at least one entry in the watch list 135. If the SIP transaction monitor determines there is at least one match (block 754), block 760 is executed to determine if the watch list entry includes a watch list action field 404 of BLOCK. If there is a match to BLOCK (block 760), the SIP transaction monitor 134 executes block 766 to create a '403' SIP response to the CPE device. The SIP transaction monitor 134 then executes block 728 of FIG. 7A to forward the '403' SIP response to the corresponding CPE device. Then, control passes back to block 704, at which the SIP transaction monitor 134 waits for the next SIP message.

Returning to block 760 of FIG. 7B, if the action match is not BLOCK, the SIP transaction monitor 134 forwards the SIP request message to the service platform 120 at block 762. Control then passes to back to block 704, at which the SIP transaction monitor 134 waits for the next SIP message. In this example implementation, the watch list action field 404 may contain BLOCK or ALLOW. Block 760 in FIG. 7B assumes if there is a match to identification information and the watch list action field 404 is not BLOCK, then the watch list action field 404 must be ALLOW. Other example implementations may contain other actions for the SIP transaction monitor 134, in which case the example machine readable instructions 700 may be modified to reflect the additional actions.

Returning to the block 754 of FIG. 7B, if the SIP transaction monitor 134 determines there is no match to the watch list 135, block 758 is executed. At block 758, the SIP transaction monitor 134 creates a temporary record from the identification information and message request type of the SIP request message and stores this temporary transaction in the temporary transaction record cache 716. Next, in block 762, the SIP transaction monitor forwards the SIP request to the service platform 120. Then, control passes back to block 704, at which the SIP transaction monitor 134 waits for the next SIP message.

Returning to block 706 of FIG. 7A, if the SIP transaction monitor 134 determines the SIP message is not a SIP request from a CPE device, the SIP transaction monitor 134 executes block 710. In block 710, the transaction monitor 134 determines if the SIP message is a final response from the service platform 120. The SIP response may be from the CPE device in response to a previous SIP request from the service platform 120 or a provisional response from the service platform 120 in response to a previous SIP request from the CPE device. If the SIP message is not a final response from the service platform 120, block 712 is executed, at which the SIP transaction monitor 134 forwards the SIP response message as requested. Additionally, SIP messages that are not SIP requests from CPE devices and/or SIP final responses from the service platform 120 are forwarded to their intended destination by the transaction monitor 134 (block 712). Then, control passes back to block 704, at which the SIP transaction monitor 134 waits for the next SIP message.

However, if in block 710 the SIP message is the final SIP response from the service platform 120 regarding a SIP request, the SIP transaction monitor 134 locates the temporary transaction record associated with the SIP request at block 714. Then, in block 718, the SIP transaction monitor 134 adds the SIP response to the temporary transaction record to create a complete transaction record, also referred to as a transaction record. Next, in decision block 720, the SIP transaction monitor 134 compares the transaction record to the monitoring rules 136. If there is not at least one match to the monitoring rules 136, block 722 is executed. At block 722, the SIP transaction monitor 134 deletes the transaction record and in block 728 forwards the SIP final response to the associated CPE device. Then, control passes back to block 704, at which the SIP transaction monitor 134 waits for the next SIP message.

However, if the SIP transaction monitor 134 in block 724 determines the transaction record matches at least one monitoring rule, the SIP transaction monitor 134 executes block 724 to insert the transaction record into the transaction record cache 138. At this point the transaction record and associated CPE device are considered suspicious or questionable. Next, in block 726, the SIP transaction monitor 134 sends a notification containing information concerning the suspicious or questionable transaction record to the intrusion detection engine 140. Then, in block 728, the SIP transaction monitor 134 forwards the final SIP response to the originating CPE device. Control then passes back to block 704, at which the SIP transaction monitor 134 waits for the next SIP message.

Example machine readable instructions 800 that may be executed to implement the example intrusion detection engine 140 of FIGS. 1 and/or 2 are shown in FIG. 8. The example machine readable instructions 800 may be executed at predetermined intervals, based on an occurrence of a predetermined event, etc., or any combination thereof. For example, the machine readable instructions 800 may be executed upon start-up of the intrusion detection engine 140, at predetermined intervals, such as hourly, daily, etc. Additionally or alternatively, the example machine readable instructions 800 may be executed upon the occurrence of a trigger generated remotely, for example, at the improper user mitigation system 130 whenever a network security protection 110 is activated, processes communication information, etc.

The example machine readable instructions 800 begin execution at block 802 of FIG. 8, at which the intrusion detection engine 140 of FIGS. 1 and/or 2 waits for a notification of a new suspicious or questionable transaction record from the SIP transaction monitor 134. For every instance of a notification of a new suspicious or questionable transaction record from the SIP transaction monitor 134, a new block 804 may be initiated. In block 804, the intrusion detection engine 140 receives a notification forwarded by the SIP transaction monitor 134 of a new suspicious or questionable transaction record saved to the transaction record cache 138. Next, in block 806, the intrusion detection engine 140 uses the identification information in the notification to find transaction records with the same IP address in the transaction record cache 138. Then, in block 808, the intrusion detection engine 140 deletes transaction records with an expired time-to-keep parameter 514. Next, the intrusion detection engine 140 compares the non-expired transaction records to the detection rules 137 and counts the number of records matching the criteria in each detection rule (block 810).

The intrusion detection engine 140 then accumulates the total number of transaction records matching each detection rule (block 812). Then, the intrusion detection engine 140 compares the number of matching transaction records per detection rule to the corresponding transaction threshold 606 and observation window value (block 816). Next in block 818, if there are no instances where the number of matching transaction records exceeds and/or equals the corresponding transaction threshold value within the time specified in the observation window, control returns to block 802 and the intrusion detection engine 140 waits for a notification from the SIP transaction monitor 134. However, if there is at least one instance where the number of matching transaction records exceeds and/or equals the corresponding transaction threshold value within the time specified in the observation window, control proceeds to block 820. In block 820, the detection rules 137 provide the intrusion detection engine 140 with the detection rules action parameter 608 corresponding to the detection rule(s) where the number of matching transaction records exceeds and/or equals the transaction threshold. If the detection rules action parameter 608 is BLOCK, block 822 is executed. In block 822, the intrusion detection engine 140 saves the originating device IP address and corresponding identification information to the watch list 135 with a watch list action parameter of BLOCK. Subsequently, in block 824, the intrusion detection engine 140 saves all the transaction records from the IP address into a the intrusion record repository 142, and in block 826, sends an alert to the attack alert interface 152 as part of the OSS interface 150. Then, control returns to block 802, where the intrusion detection engine 140 finishes processing and awaits a new notification from the SIP transaction monitor 134.

If the detection rules action parameter 608 is not BLOCK (block 820), block 824 is executed. In block 824, the intrusion detection engine 140 saves all the transaction records from the IP address into the intrusion record repository 142 and, in block 826, sends an alert to the attack alert interface 152 as part of the OSS interface 150. Then, block 828 is executed, at which the intrusion detection engine 140 finishes processing and awaits a new notification from the SIP transaction monitor 134. In this example implementation, the detection list action parameter 608 may contain BLOCK or ALERT. Block 820 in FIG. 8 assumes if there is a match to identification information and the detection list action parameter 608 is not BLOCK, then the detection list action parameter 608 must be ALERT. Other implementations may contain other actions for the intrusion detection engine 140, in which case the example machine readable instructions 800 may be modified to reflect the additional actions.

Figure 9:
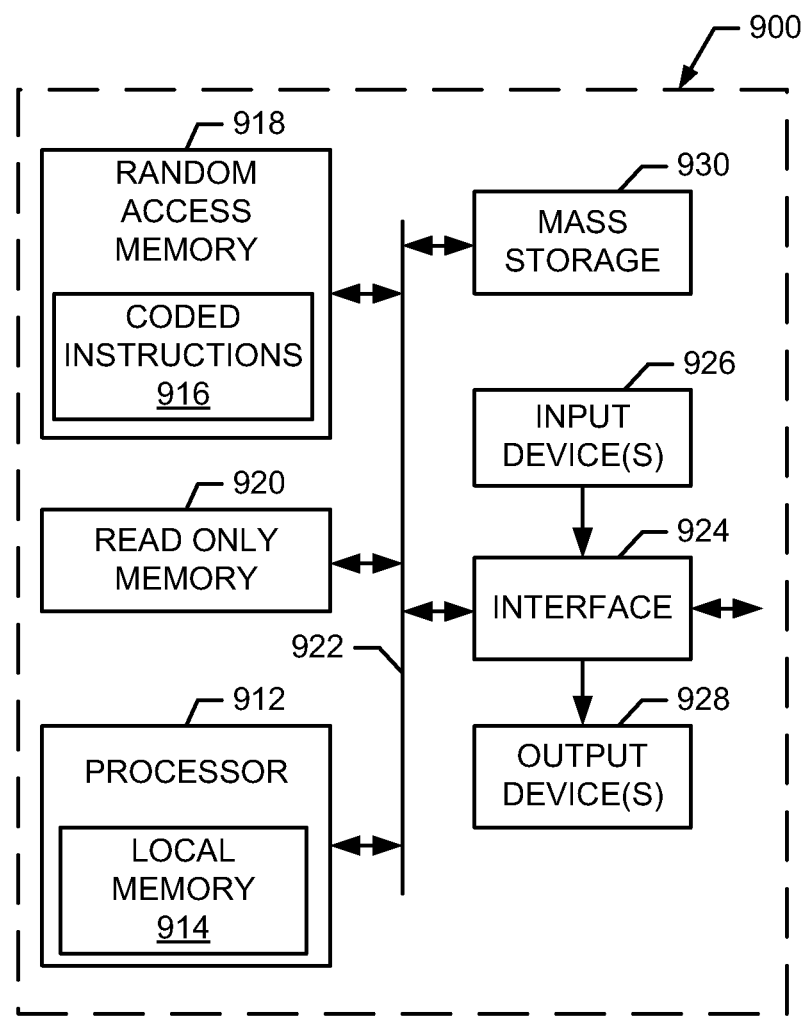
FIG. 9 is a block diagram of an example computer that may execute the example machine readable instructions of FIGS. 7A, 7B, and/or 8 to implement the example system of FIG. 1, the example SIP Transaction Monitor of FIG. 2, and/or the example Intrusion Detection Engine of FIG. 2.

FIG. 9 is a block diagram of an example computer 900 capable of implementing the apparatus and methods disclosed herein. The computer 900 can be, for example, a server, a personal computer, a personal digital assistant (PDA), an internet appliance, a DVD player, a CD player, a digital video recorder, a personal video recorder, a set top box, or any other type of computing device. Any or all of the example SIP interface 132, the example SIP transaction monitor 134, the example intrusion detection engine 140, the example transaction record cache 138, the example monitoring rules 136, the example watch list 135, the example detection rules 137, the example intrusion records repository 142, the example OSS interface 150, the example attack alert interface 152, the example policy rule user interface 156, the example an intrusion record reviewer 154, and/or the example improper user mitigation system 130 may be implemented in and/or implemented by the example computer 900.

The system 900 of the illustrated example includes a processor 912 such as a general purpose programmable processor. The processor 912 includes a local memory 914, and executes coded instructions 916 present in the local memory 914 and/or in another memory device. The processor 912 may execute, among other things, the machine readable instructions represented in FIGS. 7A, 7B, and/or 8. The processor 912 may be any type of processing unit, such as one or more microprocessors from the Intel® Centrino® family of microprocessors, the Intel® Pentium® family of microprocessors, the Intel® Itanium® family of microprocessors, the Intel® Core® family of microprocessors, and/or the Intel® XScale® family of processors. Of course, other processors from other families are also appropriate.

The processor 912 is in communication with a main memory including a volatile memory 918 and a non-volatile memory 920 via a bus 922. The volatile memory 918 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 920 may be implemented by flash memory and/or any other desired type of memory device. Access to the main memory 918, 920 is typically controlled by a memory controller (not shown) in a conventional manner.

The computer 900 also includes a conventional interface circuit 924. The interface circuit 924 may be implemented by any type of well known interface standard, such as an Ethernet interface, a universal serial bus (USB), and/or a third generation input/output (3 GIO) interface.

One or more input devices 926 are connected to the interface circuit 924. The input device(s) 926 permit a user to enter data and commands into the processor 912. The input device(s) can be implemented by, for example, a keyboard, a mouse, a touchscreen, a track-pad, a trackball, an isopoint and/or a voice recognition system.

One or more output devices 928 are also connected to the interface circuit 924. The output devices 928 can be implemented, for example, by display devices (e.g., a liquid crystal display, a cathode ray tube display (CRT)), by a printer and/or by speakers. The interface circuit 924, thus, typically includes a graphics driver card.

The interface circuit 924 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 900 also includes one or more mass storage devices 930 for storing software and data. Examples of such mass storage devices 930 include floppy disk drives, hard drive disks, compact disk drives and digital versatile disk (DVD) drives. The mass storage devices 930 may implement any or all of the monitoring rules 136, the watch list 135, the detection rules 137, and/or the intrusion record repository 142. Additionally or alternatively, the volatile memory 918 may implement any or all of the monitoring rules 136, the watch list 135, the detection rules 137, and/or the intrusion repository 142.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to protect a service platform, the method comprising:
    detecting, with a processor, responses from the service platform indicative of questionable signaling protocol transactions;
    storing transaction records corresponding to the questionable signaling protocol transactions, at least one of the transaction records identifying a signaling protocol message and an associated first originating device address corresponding to a respective questionable transaction;
    monitoring a user identifier for a first threshold number of Session Initiation Protocol requests when the user identifier is associated with only the first originating device address;
    monitoring the user identifier for a second threshold number of Session Initiation Protocol requests when the user identifier is associated with the first originating device address at a first time and a second originating device address at a second time; and
    generating a response indicating that the first originating device address is associated with an improper intrusion of the service platform.

2. A method as defined in claim 1, wherein generating the response further comprises determining whether to at least one of block the first originating device address from accessing the service platform or generating an alert.

3. A method as defined in claim 1, wherein the service platform is a Voice over Internet Protocol service platform.

4. A method as defined in claim 1, wherein the signaling protocol transactions comprise the session initiation protocol requests.

5. A method as defined in claim 1, wherein the at least one of the transaction records comprises a request message from the first originating device address and a response message from the service platform.

6. A method as defined in claim 5, wherein the request message comprises at least one of the associated first originating device address, a public user identifier, a private user identifier, a request method, a transaction identifier, or a time stamp.

7. A method as defined in claim 1, further comprising:
    detecting a request message comprising at least one of the questionable signaling protocol transactions;
    comparing a device address included in the request message to a list of blocked addresses; and
    blocking the device address when the device address matches at least one of the blocked addresses.

8. A method as defined in claim 1, wherein storing the transaction records further comprises accumulating questionable transaction records corresponding to the first originating device address and counting instances of substantially similar questionable transaction records corresponding to the first originating device address.

9. A method as defined in claim 1, wherein at least one of the questionable signaling protocol transactions comprises one of a session initiation protocol Register or session initiation protocol Invite message associated with the first originating device address resulting in a session initiation protocol server error response message from the service platform.

10. A method as defined in claim 1, wherein at least one of the questionable signaling protocol transactions comprises one of a session initiation protocol Register or session initiation protocol Invite message associated with a second originating device address and including a private user identifier and a public user identifier associated with the first originating device address resulting in a session initiation protocol server error response message or a session initiation protocol client error response message from the service platform.

11. A method as defined in claim 1, wherein the at least one of the questionable signaling protocol transactions further comprises one of a number of similar transactions equal or greater than a defined frequency threshold.

12. A method as defined in claim 11, wherein the defined frequency threshold is a number of similar questionable transactions detected within a time period.

13. A method as defined in claim 11, wherein determining whether the first originating device address is associated with an improper intrusion further comprises determining if the number of similar transactions are equal or greater than the defined frequency threshold.

14. A method as defined in claim 13, further comprising determining whether the first originating device address is associated with a second improper intrusion by determining if the number of similar transactions are equal or greater than a second defined frequency threshold.

15. A method as defined in claim 14, wherein the second improper intrusion has a different intrusion pattern than the improper intrusion.

16. An apparatus to protect a service platform, the apparatus comprising:
    a transaction monitor to detect responses from the service platform indicative of questionable signaling protocol transactions;
    a transaction cache to store transaction records corresponding to the questionable signaling protocol transactions, at least one of the transaction records to identify a signaling protocol message and an associated first originating device address corresponding to a respective questionable transaction; and
    an intrusion detection engine to monitor a user identifier for a first threshold number of Session Initiation Protocol requests when the user identifier is associated with only the first originating device address, to monitor the user identifier for a second threshold number of Session Initiation Protocol requests when the user identifier is associated with the first originating device address at a first time and a second originating device address at a second time, and to generate a response indicating that the first originating device address is associated with an improper intrusion of the service platform.

17. An apparatus as defined in claim 16, wherein the service platform is a Voice over Internet Protocol service platform.

18. An apparatus as defined in claim 16, wherein the intrusion detection engine is to determine whether to at least one of block the first originating device address from accessing the service platform or to generate an alert indicating that the first originating device address is associated with a violation of at least one detection rule.

19. An apparatus as defined in claim 18, wherein at least one detection rule comprises at least one of a device request field, a service platform response field, a public identifier-private identifier-IP address correlation field, a transaction record threshold field, or an observation window field.

20. An apparatus as defined in claim 18, further comprising an intrusion alert interface to display an intrusion alert message to a network operation.

21. An apparatus as defined in claim 20, wherein the intrusion alert message is to include the at least one of the transaction records and the corresponding first originating device address.

22. An apparatus as defined in claim 16, wherein the transaction monitor is to:
  detect a request message comprising at least one of the questionable signal protocol transactions;
  compare a device address included in the request message to a list of blocked addresses; and
  block the device address when the device address substantially matches at least one of the blocked addresses.

23. An apparatus as defined in claim 16, further comprising a policy rule repository to store a monitoring rule set for use by the transaction monitor to detect questionable transaction records, a detection rule set for use by the intrusion detection engine to determine whether the first originating device address is associated with an improper intrusion, and a list of blocked addresses.

24. An apparatus as defined in claim 23, wherein the policy rule repository includes an administrative interface to enable modification of at least one of the monitoring rule set, the detection rule set, or the list of blocked addresses by a network operator.

25. An apparatus as defined in claim 16, wherein the transaction cache is to include a time-to-keep parameter associated with the corresponding stored transaction record.

26. An apparatus defined in claim 25, wherein the transaction monitor is to delete each transaction record based on the time-to-keep parameter.

27. An apparatus as defined in claim 16, further comprising an intrusion record repository to store transaction records associated with the first originating device address when the intrusion detection engine determines the first originating device address is associated with the improper intrusion.

28. An apparatus as defined in claim 27, wherein the intrusion record cache includes an administrative interface to at least one of display or enable modification of determined improper intrusions by a network operator.

29. An apparatus as defined in claim 16, wherein the intrusion detection engine is to accumulate questionable transaction records corresponding to the originating device address and count instances of substantially similar questionable transaction records corresponding to the originating device address.

30. A apparatus as defined in claim 29, wherein the intrusion detection engine is to determine whether the first originating device address is associated with an improper intrusion of the service platform by determining if a number of instances of substantially similar questionable transaction records are equal or greater than a defined frequency threshold.

31. An apparatus as defined in claim 16, wherein detecting questionable signaling protocol responses comprises a last security check of incoming Session Initiation Protocol messages within at least one of a firewall, an Intrusion Detection System or an Intrusion Protection System.

32. A method as defined in claim 1, wherein the user identifier comprises at least one of a public user identifier associated with a voice over Internet protocol subscriber or a private user identifier associated with a subscriber account.

33. A tangible machine readable storage device comprising instructions which, when executed, cause a machine to perform operations comprising:
  detecting responses from a service platform indicative of questionable signaling protocol transactions;
  storing transaction records corresponding to the questionable signaling protocol transactions, at least one of the transaction records identifying a signaling protocol message and an associated first originating device address corresponding to a respective questionable transaction;
  monitoring a user identifier for a first threshold number of Session Initiation Protocol requests when the user identifier is associated with only the first originating device address;
  monitoring the user identifier for a second threshold number of Session Initiation Protocol requests when the user identifier is associated with the first originating device address at a first time and a second originating device address at a second time; and
  generate a response indicating that the first originating device address is associated with an improper intrusion of the service platform.

34. A machine readable storage device as defined in claim 33 wherein the operations further comprise determining whether to at least one of block the first originating device address from accessing the service platform or generate an alert indicating that the first originating device address is associated with the improper intrusion of the service platform.

35. A machine readable storage device as defined in claim 33 wherein the operations further comprise:
  detecting a request message comprising at least one of the questionable signaling protocol transactions;
  comparing a device address included in the request message to a list of blocked addresses; and
  blocking the device address when the device address matches at least one of the blocked addresses.

36. A machine readable storage device as defined in claim 33 wherein the operations further comprise accumulating questionable transaction records corresponding to the first originating device address and count instances of substantially similar questionable transaction records corresponding to the first originating device address.

37. A machine readable storage device as defined in claim 33 wherein the operations further comprise determining if a number of similar transactions are equal or greater than the defined frequency threshold to identify whether the first originating device address is associated with the improper intrusion.

38. A machine readable storage device as defined in claim 37 wherein the operations further comprise determining whether the first originating device address is associated with a second improper intrusion by determining if the number of similar transactions are equal or greater than a second defined frequency threshold.

* * * * *